(12) United States Patent
Rollins et al.

(10) Patent No.: US 8,401,403 B2
(45) Date of Patent: Mar. 19, 2013

(54) TIMING RECOVERY IN PRESENCE OF OPTICAL IMPAIRMENTS AND OPTIMIZATION OF EQUALIZATION BASED ON TIMING RECOVERY MOMENT STRENGTHS

(75) Inventors: Mark Edward Rollins, Stittsville (CA); Andrew Deczky, Ottawa (CA)

(73) Assignee: Ciena Corporation, Hanover, MD (US)

( * ) Notice: Subject to any disclaimer, the term of this patent is extended or adjusted under 35 U.S.C. 154(b) by 361 days.

(21) Appl. No.: 12/772,699

(22) Filed: May 3, 2010

(65) Prior Publication Data

US 2011/0268459 A1    Nov. 3, 2011

(51) Int. Cl.
*H04B 10/06* (2006.01)
(52) U.S. Cl. ....................................................... 398/208
(58) Field of Classification Search .................... 398/208
See application file for complete search history.

(56) References Cited

U.S. PATENT DOCUMENTS

| 8,095,019 B2* | 1/2012 | Kaneda et al. | 398/208 |
| 8,107,817 B2* | 1/2012 | Lin et al. | 398/81 |
| 2007/0065162 A1* | 3/2007 | Kikuchi | 398/208 |

OTHER PUBLICATIONS

M.S. Alfiad et al.; "A Comparison of Electrical and Optical Dispersion Compensation for 111-Gb/s POLMUX-RZ-DQPSK", IEEE Journal of Lightwave Techology, vol. 27, No. 16, Aug. 2009, pp. 3590-3598.
Y. Wang et al., "Blind Feedforward Symbol Timing Estimator for Linear Modulations", IEEE Trans on Communications, vol. 3, No. 3, May 2004, pp. 709-715.
Y. Yang et al., "Performance Analysis of a Class of Nondata-Aided Frequency Offset and Symbol Timing Estimators for Flat-Fading Channels", IEEE Transactions on Signal Processing, vol. 50, No. 9, Sep. 2002.
B. Fu et al., "Fiber Chromatic Dispersion and Polarization-Mode Dispersion Monitoring Using Coherent Detection", IEEE Photonics Technology Letters, vol. 17, No. 7, Jul. 2005.
S-M. Kim et al., "The Efficient Clock-Extraction Methods of NRZ Signal for Chromatic Dispersion Monitoring", IEEE Photonics Technology Letters, vol. 17, No. 5, May 2005.
W. M. Gardner, "Exploitation of Spectral Redundancy in Cyclostationary Signals", IEEE Signal Processing Magazine, Apr. 1991.
C. Laperle et al., "WDM Performance and PMD Tolerance of a Coherent 40-Gbit/s Dual-Polarization QPSK Transceiver"{, IEEE Journal of Lightwave Technology, vol. 26, No. 1, Jan. 2008.
S. J. Savory, "Digital Filters for Coherent Optical Receivers", Optics Express, vol. 16, No. 2, Jan. 2008.

(Continued)

*Primary Examiner* — Shi K Li
(74) *Attorney, Agent, or Firm* — Clements Bernard PLLC; Christopher L. Bernard; Lawrence A. Baratta, Jr.

(57) ABSTRACT

The present disclosure provides timing recovery in optical systems in the presence of chromatic dispersion (CD), polarization mode dispersion (PMD), and polarization dependent loss (PDL) and to optimization of equalization settings based upon timing recovery moment strengths. A stable timing point may be determined in the presence of PMD and PDL impairments, even when the direct estimate of timing becomes unreliable. This determination may be performed entirely in the digital domain providing precise, predictable performance. Also, the present invention utilizes a monotonic relationship between the timing metric and CD setting error to provide directed search in setting the CD equalizer thereby reducing significantly the overall search effort in optimizing CD equalizer settings. This utilizes computations already performed by the transceiver for timing recovery function yielding a computational advantage over competing methods.

11 Claims, 17 Drawing Sheets

OTHER PUBLICATIONS

I. Shake et al., "Quality Monitoring of Optical Signals Influenced by Chromatic Dispersion in a Transmission Fiber Using Averaged Q-factor Evaluation", IEEE Photonics Technology Letters, vol. 13, No. 4, Apr. 2001.

M. Tomizawa et al., "Nonlinear Influence on PM-AM Conversion Measurement of Group Velocity Dispersion in Optical Fibers", Electronics Letters, vol. 30, No. 17, Aug. 1994.

Y. Wang et al., "An Alternative Blind Feedforward Symbol Timing Estimator Using Two Samples Per Symbol", IEEE Transactions on Communications, vol. 51, No. 9, Sep. 2002, pp. 1451-1455.

F. Gini et al., "Frequency Offset and Symbol Timing Recovery in Flat-Fading Channels: a Cyclostationary Approach", IEEE Transactions on Communications, vol. 46, No. 3, Mar. 1998, pp. 400-411.

E. Ip and J. M. Kahn, "Digital Equalization of Chromatic Dispersion and Polarization Mode Dispersion", IEEE Journal of LIghtwave Technology, vol. 25, No. 8, Aug. 2007.

M. Kuschnerov et al., "DSP for Coherent Single-Carrier Receivers", IEEE Journal of LIghtwaver Technology, vol. 27, No. 16, Aug. 2009.

M. Oerder and H. Meyr, "Digi9tal Filter and Square Timing Recovery", IEEE Transactions on Communications, vol. 36, No. 3, Mar. 1988.

* cited by examiner

TIMING RECOVERY IN PRESENCE OF OPTICAL IMPAIRMENTS AND OPTIMIZATION OF EQUALIZATION BASED ON TIMING RECOVERY MOMENT STRENGTHS

FIELD OF THE INVENTION

The present invention relates generally to optical communications. More particularly, the present invention relates to timing recovery in optical systems in the presence of chromatic dispersion (CD), polarization mode dispersion (PMD), and polarization dependent loss (PDL) and to optimization of equalization settings based upon timing recovery moment strengths.

BACKGROUND OF THE INVENTION

Currently proposed very high speed transmission systems over optical fiber at 100 Gbps and beyond use multiple bits per symbol as well as multiple polarizations in order to reduce the cost and complexity of the design. For example, a typical implementation may include two polarizations used with Quadrature Amplitude Modulation (QAM) (such as Quadrature Phase Shift Keying (QPSK)) on two orthogonal carriers on each polarization. At the receiver of such a system, the two polarizations are typically recovered in an optical module where the quadrature signals are demodulated to baseband and converted to the two quadrature electrical signals for each polarization. One of the key functions of such a receiver is to determine a timing point of the data such that the sampling point falls in the center of the recovered analog waveform. Methods of timing recovery have been proposed in Y. Wang et al., "An alternate Blind Feedforward Symbol Timing Estimator Using Two samples par Symbol", IEEE Transactions on communications, Vol. 51, No. 9, September, 2002, pp 1451-1455; F Gini et al., "Frequency Offset and Symbol Timing Recovery in Flat-Fading Channels: a Cyclostationary Approach", IEEE Transactions on communications, Vol. 46, No. 3, March, 1998, pp 400-411; and Y. Wang et al., "Blind Feedforward Symbol Timing Estimator for Linear Modulations", IEEE Trans on Communications, Vol 3, No 3, May 2004, pp 709-715. These methods typically use a non linearity to generate a spectral component at two or higher over sampling rates and apply to a single possibly complex input signal.

High speed transmission over optical fiber suffers from a number of well known impairments. In particular the signal is subjected to Polarization-mode dispersion (PMD) where the signal on one polarization at the receiver is a mixture of the two polarization signals transmitted, chromatic dispersion (CD) where the signal is subjected to a parabolic increasing phase distortion along the fiber, polarization dependent loss (PMD) where the gain of the two polarizations is not the same, and polarization delay imbalance where the travel time of the two polarizations is not the same. The methods described above may be used to detect the timing on a single two times oversampled QAM signal. However, after mixing of the two polarizations, the timing estimate disappears for certain combinations of polarization delay and angle. Thus in the presence of arbitrary PMD and PDL impairments, no reliable timing estimate can be derived.

Chromatic dispersion (CD) and polarization mode distortion (PMD) are key linear distortions that limit the performance of optical communication systems. Traditional direct-detect systems operating at 10 Gbps or lower rates employ dispersion compensating fiber to mitigate CD. Due to recent advances in GHz digital signal processing capability, systems operating at 40 Gbps and 100 Gbps use coherent transceivers employing electronic dispersion compensation (EDC) technology to mitigate both CD and PMD. Regardless of the specific architecture partitioning and its time vs. frequency implementation choice, EDC digital filters require correct sample phase timing to be established by the receiver. Timing recovery corrects for the phase and frequency offset between the transmitter and receiver clocks, and is often performed digitally by filtering the spectral line that appears at the symbol rate after squaring the received signal. These algorithms typically require four samples per symbol such as in M. Oerder & H. Meyr, "Digital Filter and Square Timing Recovery", IEEE Transactions on Communications, Vol. 36, No. 3, March 1988, although variants requiring only two samples per symbol also exist such as in Y. Wang et. al., "An Alternative Blind Feedforward Symbol Timing Estimator Using Two Samples Per Baud", IEEE Transactions on Communications, Vol. 51, No. 9, September 2003; and Y. Yang et. al., "Performance Analysis of a Class of Nondata-Aided Frequency Offset and Symbol Timing Estimators for Flat-Fading Channels", IEEE Transactions on Signal Processing, Vol. 50, No. 9, September 2002.

The CD parameter, $\chi$, is defined as $\chi \equiv DL$ wherein D is the dispersion parameter of a fiber and L is the fiber length. A key problem of practical importance is the computation of the CD parameter $\chi$ since this single parameter determines the tap weights of the required equalizer, for either a time-domain or a frequency-domain implementation. The value of $\chi$ may be totally unknown on short haul links, or perhaps known only to a finite tolerance of ±1500 ps/nm on typical long haul links. In either case, $\chi$ must be estimated with suitable accuracy in the presence of all channel impairments in order to solve for the CD equalization parameters. Transmission of a known periodic training signal provides one solution since the received signal may be used to compute the inverse transfer function of the CD if the transmitted signal is known. The training sequence must be retransmitted at a rate faster than the expected temporal variation of the CD response with temperature. This method is unattractive as it fails in the presence of significant PMD, and since a portion of the channel bandwidth must be devoted to the training sequence overhead. The training sequence duration may span several hundreds of taps for 100 Gbps systems with CD approaching 40,000 ps/nm.

Other approaches involve transmitting known in-band sub-carriers or pilot tones and monitoring the RF tones at the receiver such as in T. Dimmick et al., "Optical Dispersion Monitoring Techniques Using Double Sideband Carriers", IEEE Photonics Technology Letters, Vol. 12, No. 7, July 2000. These approaches use non-standard transmitters, transmitter modifications, or have high cost and complexity. Still another approach to CD monitoring involves extracting clock frequency components from the received signal. The differential phase between clock components provides one mechanism for CD monitoring such as in B. Fu et al., "Fiber Chromatic Dispersion and Polarization-Mode Dispersion Monitoring Using Coherent Detection", IEEE Photonics Technology Letters, Vol. 17, No. 7, July 2005. The overall power of the extracted clock component provides another mechanism such as in S-M. Kim et al., "The Efficient Clock-Extraction Methods of NRZ Signal for Chromatic Dispersion Monitoring", IEEE Photonics Technology Letters, Vol. 17, No. 5, May 2005. These methods employ radio frequency (RF) processing with tight analog band pass filtering to extract the clock signals, requiring additional components and complexity at the receiver.

So-called "blind" solutions not requiring the transmission of a training sequence are also popular in practice. In these cases, a traditional metric of the received signal such as (i) detecting phase modulation to intensity modulation due to CD such as in M. Tomizawa et al., "Nonlinear Influence on PM-AM Conversion Measurement of Group Velocity Dispersion in Optical Fibers", Electronics Letters, Vol. 30, No. 17, August 1994; (ii) recovered Q-factor such as in I. Shake et al., "Quality Monitoring of Optical Signals Influenced by Chromatic Dispersion in a Transmission Fiber Using Averaged Q-factor Evaluation", IEEE Photonics Technology Letters, Vol. 13, No. 4, April 2001; or (iii) signal-to-noise ratio (SNR) is evaluated and used to evaluate the quality of a given estimate $\hat{\chi}$ of $\chi$, or equivalently the current CD equalizer settings. The key drawback of these approaches is that typical metrics such as Q-factor or SNR provide no direct relationship to the desired setting $\chi$ or the error $(\hat{\chi}-\chi)$ in the current setting $\hat{\chi}$, or even if the current setting should be increased or decreased in order to improve performance. Consequently, such solutions lead to complex and inefficient "exhaustive searches" where the signal metric must be evaluated for all possible candidate settings for $\hat{\chi}$ ((ie. the full range of $\chi$).

A typical example of this "blind search" approach is described in M. Kuschnerov et al., "DSP for Coherent Single-Carrier Receivers", IEEE Journal of Lightwave Technology, Vol. 27, No. 16, August 2009. The algorithm evaluates for every possible value of CD setting $\chi$ a metric based on Godard's original CMA equalizer that measures the deviation from constant amplitude of the CD equalizer output. The minimum obtained metric identifies the best setting for the CD equalizer. A "two-pass" search is proposed where the first pass uses coarsely spaced settings for $\chi$, and then a second pass uses a set of finely spaced settings centered around the best setting found by the first pass. One large drawback of this algorithm is its complexity. Evaluation of the Godard metric is costly in computation and is required solely for identifying the proper $\chi$ setting; these computations are not shared nor required by any other transceiver functions. This complexity burden is amplified by the inefficiency of the two-pass blind search. Finally, the accuracy of the algorithm given by Kuschnerov et al. degrades significantly as the amount of PMD increases. Ideally, any metric-based solution should provide the same accuracy for $\chi$ independent of level of PMD/PDL distortion.

One alternative solution to the metric-based "blind searches" for the CD setting $\chi$ involves combining the CD and PMD/PDL digital filters into a single "butterfly" structure that addresses both CD and PMD/PDL distortions. Then an adaptive algorithm such as CMA or LMS provides a solution for the time-varying tap weights of the complete structure. This approach no longer requires an explicit solution for the CD setting $\chi$, but instead incurs a significant complexity burden. The "butterfly" structure requires the adaptation of hundreds of taps to handle both CD and PMD/PDL, whereas adaptation of only tens of taps is required to handle PMD/PDL for typical 100 Gbps systems desired to span 2000 km links.

BRIEF SUMMARY OF THE INVENTION

In an exemplary embodiment, a receive includes an optical module receiving a quadrature amplitude modulated optical signal; analog-to-digital conversion circuitry configured to convert the quadrature amplitude modulated optical signal into a digital signal; and timing recovery circuitry configured to provide a timing estimation of the digital signal utilizing a cyclic correlation. The receiver further includes chromatic dispersion equalization configured to filter chromatic dispersion on either the quadrature amplitude modulated optical signal or the digital signal, wherein settings on the chromatic dispersion equalization are based upon timing moment magnitudes from the timing recovery circuitry. The timing recovery circuitry is configured to provide the timing estimation in the presence of polarization mode dispersion, polarization dependent loss, and polarization delay imbalance. The quadrature amplitude modulated optical signal may include a polarization multiplexed signal with two polarizations X and Y, and wherein the cyclic correlation for each polarization is a function of an angle between X and Y and delay between X and Y. The timing recovery circuitry is configured to form two new signals W and Z from X and Y to overcome nulls in the cyclic correlation, and wherein the timing estimation is provided utilizing cyclic correlations associated with each of the signals X, Y, W, and Z. The timing recovery circuitry is configured to compute a timing estimate A based upon the cyclic correlations associated with the signals X and Y and a timing estimate B based upon the cyclic correlations associated with the signals W and Z, and wherein the timing recovery circuitry is configured to select either the timing estimate A or the timing estimate B based upon a comparison involving two or more of the cyclic correlations associated with each of the signals X, Y, W, and Z. The timing recovery circuitry may utilize sub multiplexing to minimize hardware in the timing recovery circuitry. The timing recovery circuitry is further configured to perform a phase remapping procedure when switching between the timing estimate A and the timing estimate B.

In another exemplary embodiment, an optical receiver with chromatic dispersion equalization includes an optical module receiving a quadrature amplitude modulated optical signal; analog-to-digital conversion circuitry configured to convert the quadrature amplitude modulated optical signal into a digital signal; timing recovery circuitry configured to provide a timing estimation of the digital signal; and chromatic dispersion equalization configured to filter chromatic dispersion on either the quadrature amplitude modulated optical signal or the digital signal, wherein settings on the chromatic dispersion equalization are based upon timing moment magnitudes from the timing recovery circuitry. The settings include a frequency response of the chromatic dispersion equalization. The optical receiver further includes searching circuitry configured to perform a directed search for the settings based upon the timing moment magnitudes. The timing recovery circuitry utilizes a cyclic correlation to provide the timing estimate. The timing recovery circuitry is configured to provide the timing estimation in the presence of polarization mode dispersion, polarization dependent loss, and polarization delay imbalance. The quadrature amplitude modulated optical signal may include a polarization multiplexed signal with two polarizations X and Y, and wherein the cyclic correlation for each polarization is a function of an angle between X and Y and delay between X and Y. The timing recovery circuitry is configured to form two new signals W and Z from X and Y to overcome nulls in the cyclic correlation, and wherein the timing estimation is provided utilizing cyclic correlations associated with each of the signals X, Y, W, and Z. The timing recovery circuitry is configured to compute a timing estimate A based upon the cyclic correlations associated with the signals X and Y and a timing estimate B based upon the cyclic correlations associated with the signals W and Z, and wherein the timing recovery circuitry is configured to select either the timing estimate A or the timing estimate B based upon a comparison involving two or more of the cyclic correlations associated with each of the signals X, Y, W, and Z. The timing recovery circuitry may utilize sub multiplexing to minimize hardware in the timing recovery circuitry. The timing recovery circuitry is further configured to perform a phase remapping procedure when switching between the timing estimate A and the timing estimate B.

In yet another exemplary embodiment, a method for timing recovery in quadrature amplitude modulated systems includes receiving signals X and Y representing quadrature amplitude modulated signals; forming signals W and Z from the signals X and Y; computing cyclic correlations CX, CY, CW, and CZ for each of the signals X, Y, W, Z; and providing a timing estimate responsive to the cyclic correlations CX, CY, CW, and CZ. The method further includes determining timing moment magnitudes; and setting a frequency response of chromatic dispersion equalization responsive to the timing moment magnitudes.

BRIEF DESCRIPTION OF THE DRAWINGS

The present invention is illustrated and described herein with reference to the various drawings of exemplary embodiments, in which like reference numbers denote like method steps and/or system components, respectively, and in which.

DETAILED DESCRIPTION OF THE INVENTION

Precise, deterministic timing is essential to avoid major loss of signal-to-noise ratio in direct conversion high speed modems using quadrature modulation. The present invention is able to determine a stable timing point in the presence of PMD and PDL impairments, even when the direct estimate of timing becomes unreliable, is able to track changes in timing (e.g. due to PMD rotation, frequency offset) during normal operation, has a complexity that may be adjusted to the rate of change of the timing point by the amount of sub multiplexing that is be applied, and may be applied entirely in the digital domain and hence provides precise, predictable performance. Also, the present invention utilizes a monotonic relationship between the timing metric and CD setting error to provide directed search in setting the CD equalizer thereby reducing significantly the overall search effort in optimizing CD equalizer settings. This utilizes computations already performed by the transceiver for timing recovery function yielding a computational advantage over competing methods. Further, accuracy of proposed timing metric does not vary with PMD/PDL levels as with prior art. The present invention may be used regardless of whether CD and PMD/PDL equalizers are implemented in the time-domain or in the frequency domain.

Figure 1:
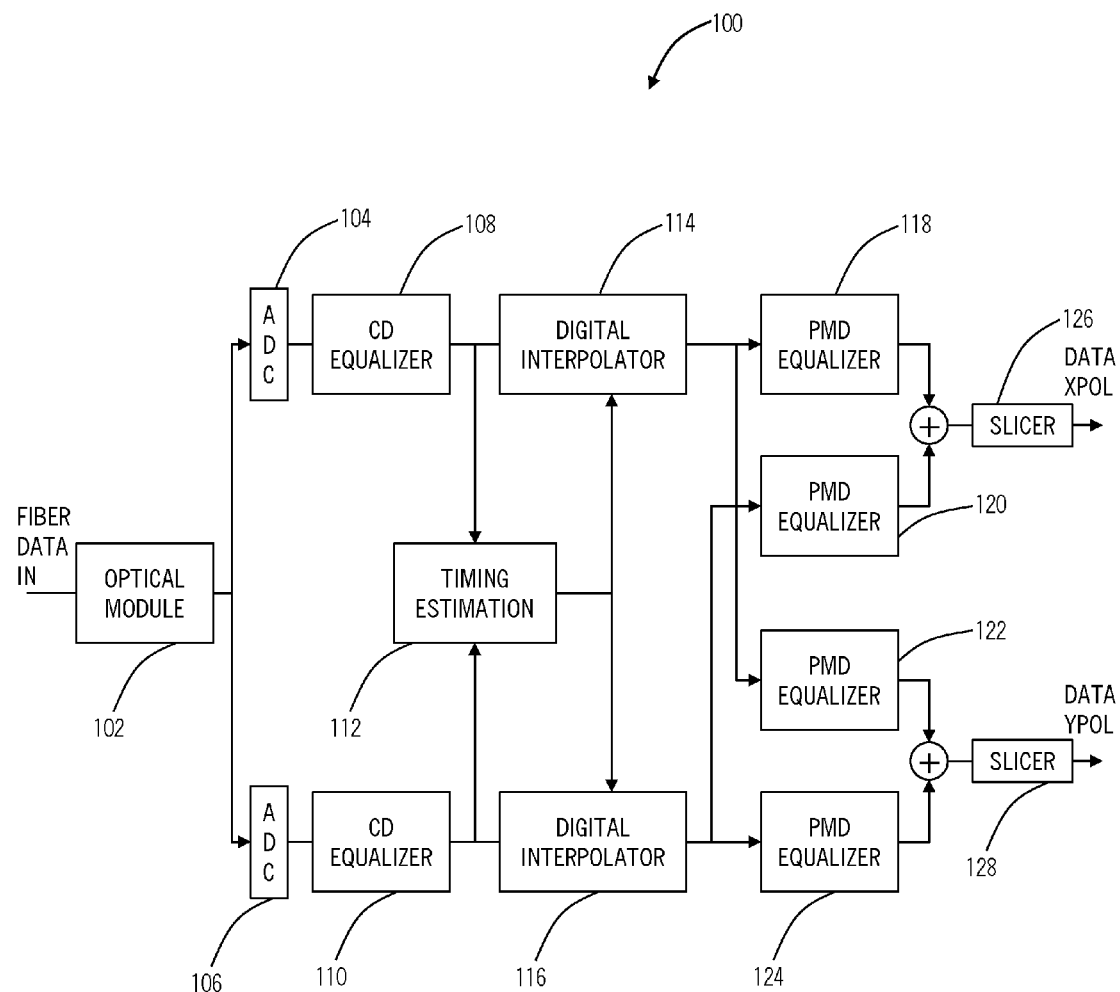
FIG. 1 is a block diagram illustrates a receiver utilizing QAM and polarization multiplexing with a timing recovery block.

Referring to FIG. 1, in an exemplary embodiment, a block diagram illustrates a receiver 100 utilizing QAM and polarization multiplexing. Specifically, two polarizations are used with Quadrature Amplitude Modulation (QAM) on two orthogonal carriers on each polarization. Note, Quadrature Phase Shift Keying (QPSK) with four phases is a subset of such modulations. At the receiver 100, the two polarizations are typically recovered in an optical module 102 where the quadrature signals are demodulated to baseband and converted to the two quadrature electrical signals for each polarization. These four electrical signals are then transmitted to analog to digital converters (ADC) 104, 106 followed by further processing in the digital domain. For example, the receiver 100 may include of equalization for chromatic dispersion CD), polarization modulated rotation (PMD) as well polarization dependent loss (PDL) caused by the fiber transmission medium. Note, FIG. 1 illustrates a simplified block diagram of the receiver 100 below using complex signal representation for each polarization. The receiver 100 includes a CD equalizer 108, 110 that is configured to electronically compensate for chromatic dispersion. Outputs of the CD equalizers 108, 110 connect to a timing estimation block 112 and digital interpolators 114, 116. One of the key functions of the receiver 100 is to determine the timing point of the data such that the sampling point falls in the center of the recovered analog waveform. The timing estimation block 112 provides a timing estimate to the digital interpolators 114, 116 which provide outputs to PMD equalizers 118, 120, 122, 124. An output of the PMD equalizers 118, 120 is combined and sent to a slicer 126 providing data output for one of the polarizations, i.e. an X polarization, and an output of the PMD equalizers 122, 124 is combined and sent to a slicer 128 providing data output for the other polarization, i.e. Y polarization.

In various exemplary embodiments, the present invention provides systems and methods for a stable timing estimate, e.g. through the timing estimation block 112, in the presence of arbitrary PMD and PDL impairments. The cyclic correlation used for timing estimation is based on the two times oversampled received signal, $X_n = x(nT)^3$:

$$CX = \sum_{n=0}^{N-2} x_n x_n^* e^{-jn\pi} + \sum_{n=0}^{N-2} \text{Real}(x_n^* x_{n+1}) e^{-j(n-0.5)\pi}$$

$$\tau = \mathrm{mod}\left(\frac{1}{\pi}\tan^{-1}(CX),\ 1\right)$$

where the timing estimate, τ, has been remapped to the range 0:1 for the digital interpolator 114 used to align the timing between the two timing instants nT and (n+1)T.

For a single signal, this gives an accurate timing estimate. In the case of a polarization multiplexed system, the estimate for a given polarization X or Y is a function of the polarization rotation and delay of the channel since the received signal can be represented by the simple model:

$$\begin{bmatrix} X_{rx} \\ Y_{rx} \end{bmatrix} = \begin{bmatrix} \cos\theta & -\sin\theta \\ \sin\theta & \cos\theta \end{bmatrix} \begin{bmatrix} e^{j\omega\delta/2} & 0 \\ 0 & e^{-j\omega\delta/2} \end{bmatrix} \begin{bmatrix} \cos\theta & \sin\theta \\ -\sin\theta & \cos\theta \end{bmatrix} \begin{bmatrix} X_{tx} \\ Y_{tx} \end{bmatrix}$$

where θ is the angle and δ is the delay between polarizations and X and Y are the two complex received polarization signals.

Figure 2:
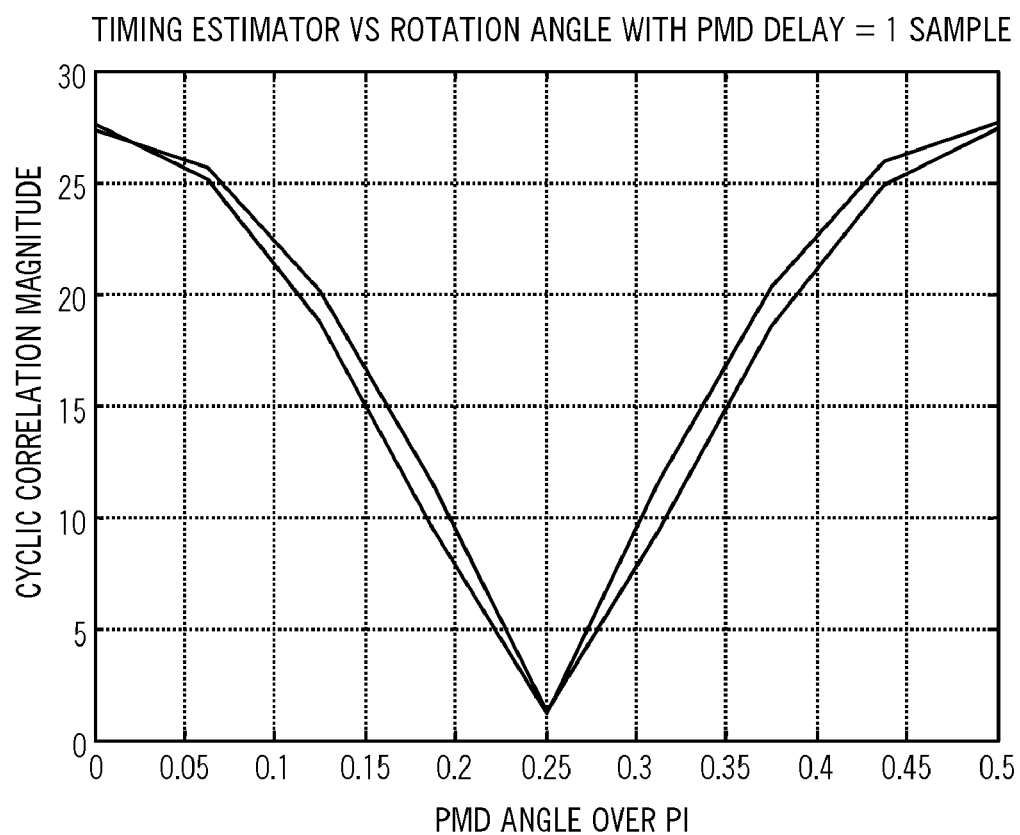
FIG. 2 is a graph of dropout of cyclic correlations CX, CY for one sample delay between two polarizations X and Y.
Figure 3:
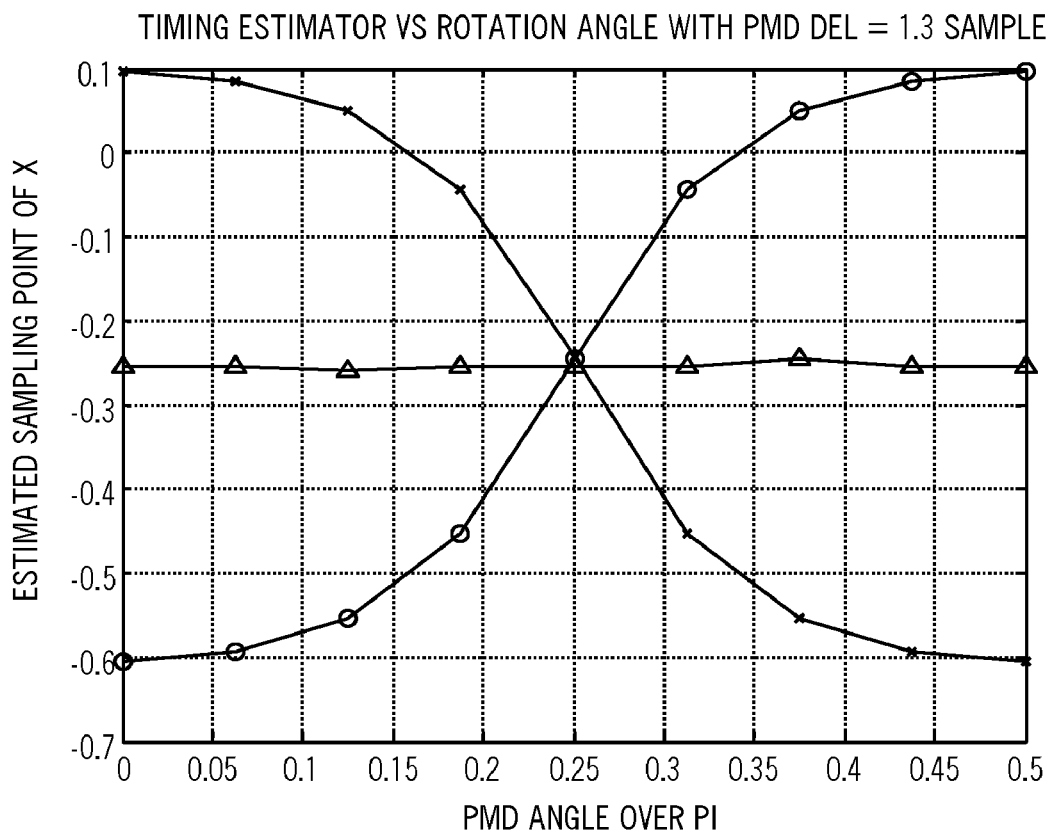
FIG. 3 is a graph of a timing estimate from cyclic correlations CX and CY.

Referring to FIGS. 2-5, various graphs are illustrated of a timing estimator versus rotation angle in the presence of PMD. The result of this mixing is that the cyclic correlation estimate for one polarization is a function of the angle and the delay. In particular, if the delay is one sample the magnitude of the cyclic correlation exhibits a null at rotation angles of π/4, 3π/4, for both the X and Y polarizations, as shown in FIG. 2. FIG. 2 is a graph of dropout of cyclic correlations CX, CY for one sample delay between the two polarizations X and Y. The result is that no accurate estimate of the timing can be derived from either of the two polarization signals at these rotation angles. In addition, the timing estimate derived from either polarization move in opposite directions with the polarization angle for other delay values is shown in FIG. 3. FIG. 3 is a graph of a timing estimate from cyclic correlations CX and CY. In FIG. 3, it is shown that the sum of the two estimated angles is approximately constant. In order to overcome the problem of dropouts and the variation of the estimate with rotation angle, two new signals may be form as follows:

$$z_n = (x_n + y_n)/2$$

$$w_n = (x_n - y_n)/2$$

Figure 4:
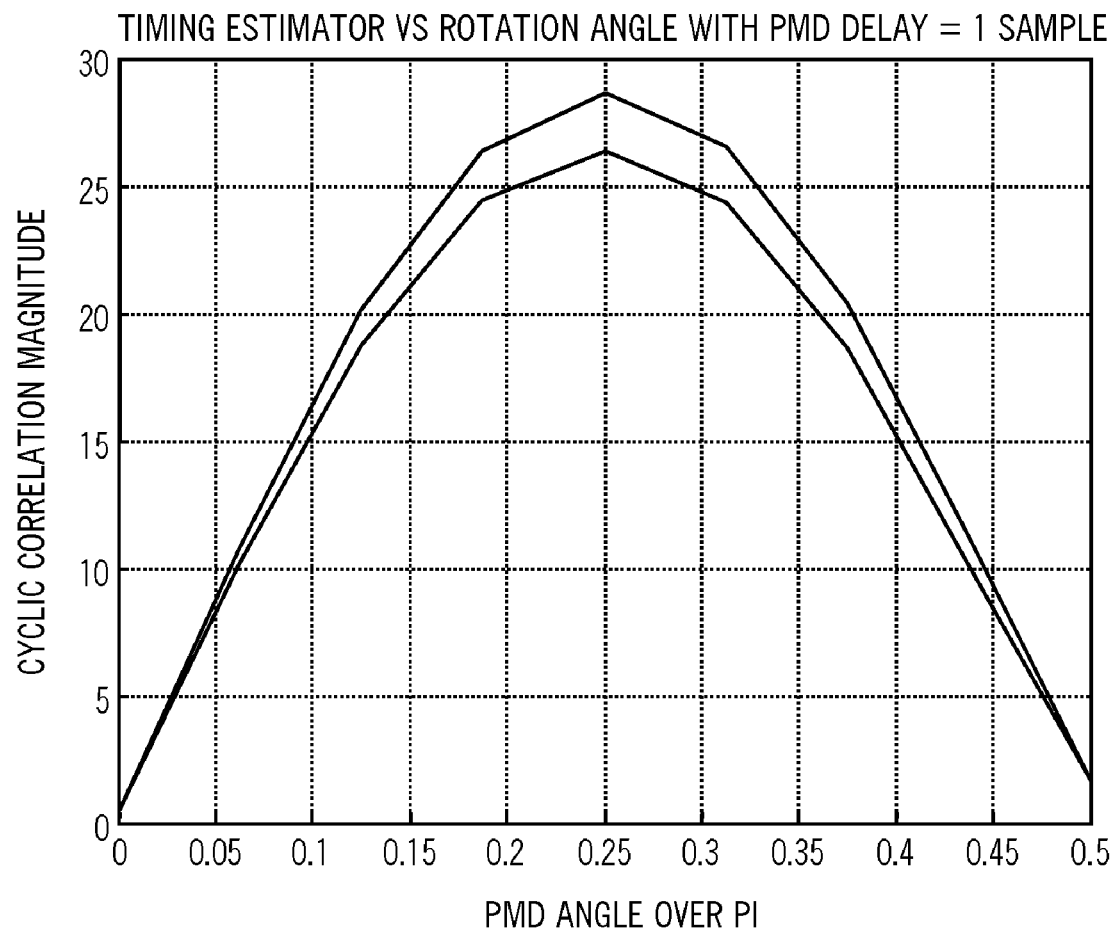
FIG. 4 is a graph of dropout of cyclic correlations CZ, CW for one sample delay between two polarizations X and Y.
Figure 5:
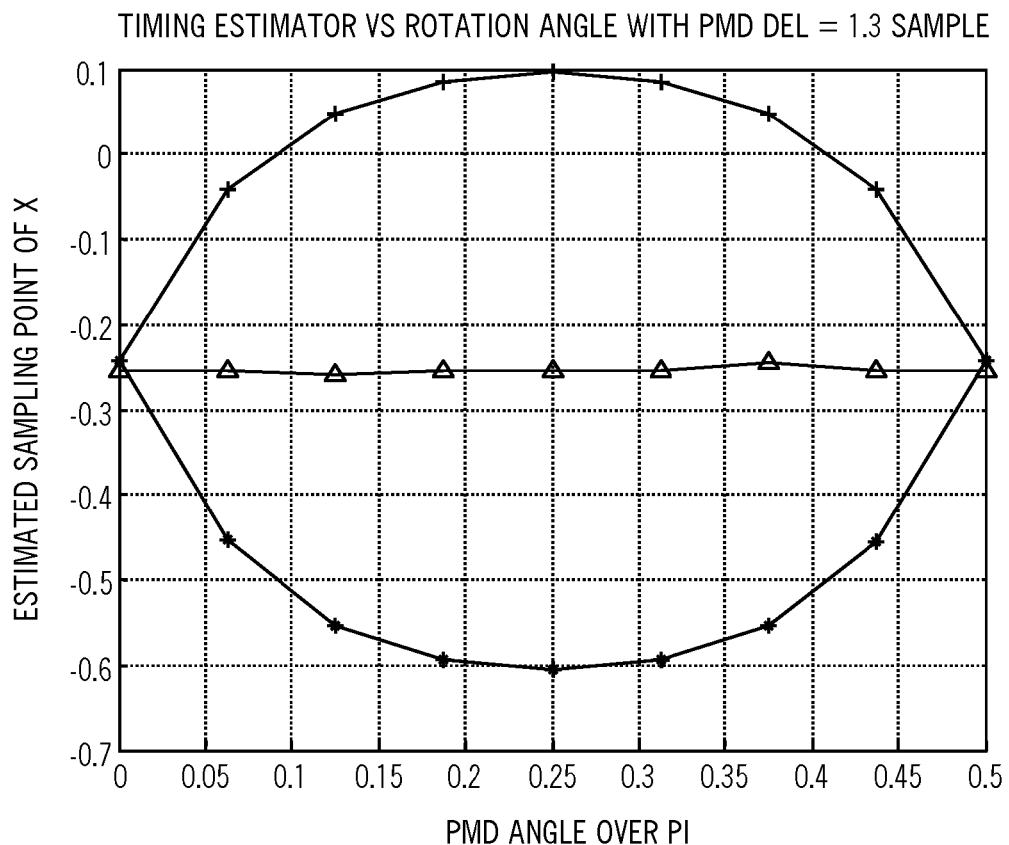
FIG. 5 is a graph of a timing estimate from cyclic correlations CZ and CW.

Next, four cyclic correlations, CX, CY, CZ and CW, may be computed from the four signals, $x_n$, $y_n$, $z_n$, $w_n$. The magnitudes of the cyclic correlations CZ, CW are shown in FIG. 4, where it may be observed that when CX and CY drop out, CZ and CW do not. FIG. 4 is a graph of dropout of cyclic correlations CZ, CW for one sample delay between the two polarizations X and Y. In addition, it observed in FIG. 5 that the estimates based on CZ and CW also move in opposite directions, with their sum being approximately constant and equal to the estimate in FIG. 3. FIG. 5 is a graph of a timing estimate from cyclic correlations CZ and CW.

From the above, it may be observed that based on the four cyclic correlations computed above, a stable timing estimate may be obtained as follows (referred to herein as computation #1):

if $(|CX|/4) \geq |CZ|)$ $$\tau = \mathrm{mod}\left(\frac{1}{2\pi}\tan^{-1}(CX \cdot CY),\ 1\right)$$

else $$\tau = \mathrm{mod}\left(\frac{1}{2\pi}\tan^{-1}(CZ \cdot CW),\ 1\right)$$

Alternatively the two cyclic correlations may be combined first and the decision made on the magnitude of the combined estimate as follows (referred to herein as computation #2):

$$PA = CX \cdot CY$$

$$PB = CZ \cdot CW$$

$$mA = |PA|$$

$$\tau A = \frac{1}{2\pi}\tan^{-1}(PA)$$

$$mB = |PB|$$

$$\tau B = \frac{1}{2\pi}\tan^{-1}(PB)$$

if $(mA) \geq mB)$ $$\tau = \tau A$$

else $$\tau = \tau B$$

$$\tau = \mathrm{mod}(\tau,\ 1)$$

In practice the cyclic correlations are computed over a block on N samples and the results are smoothed by a finite impulse response (FIR) filter before they are used. In addition the decision variables are smoothed using an Infinite impulse response (IIR) filter.

Figure 6:
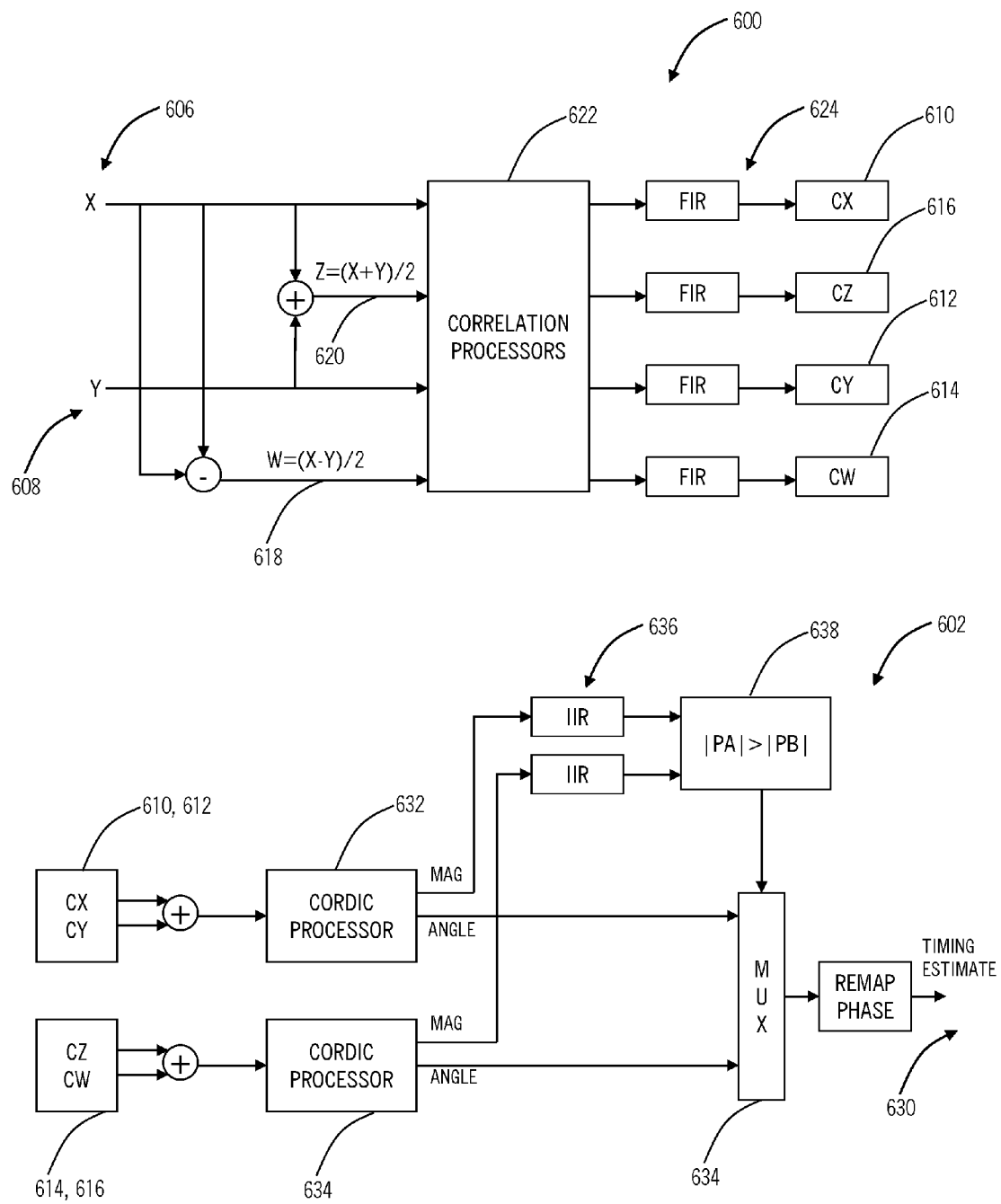
FIG. 6 is a block diagram of a cyclic correlation computation circuit and a timing estimate computation circuit.
Figure 7:
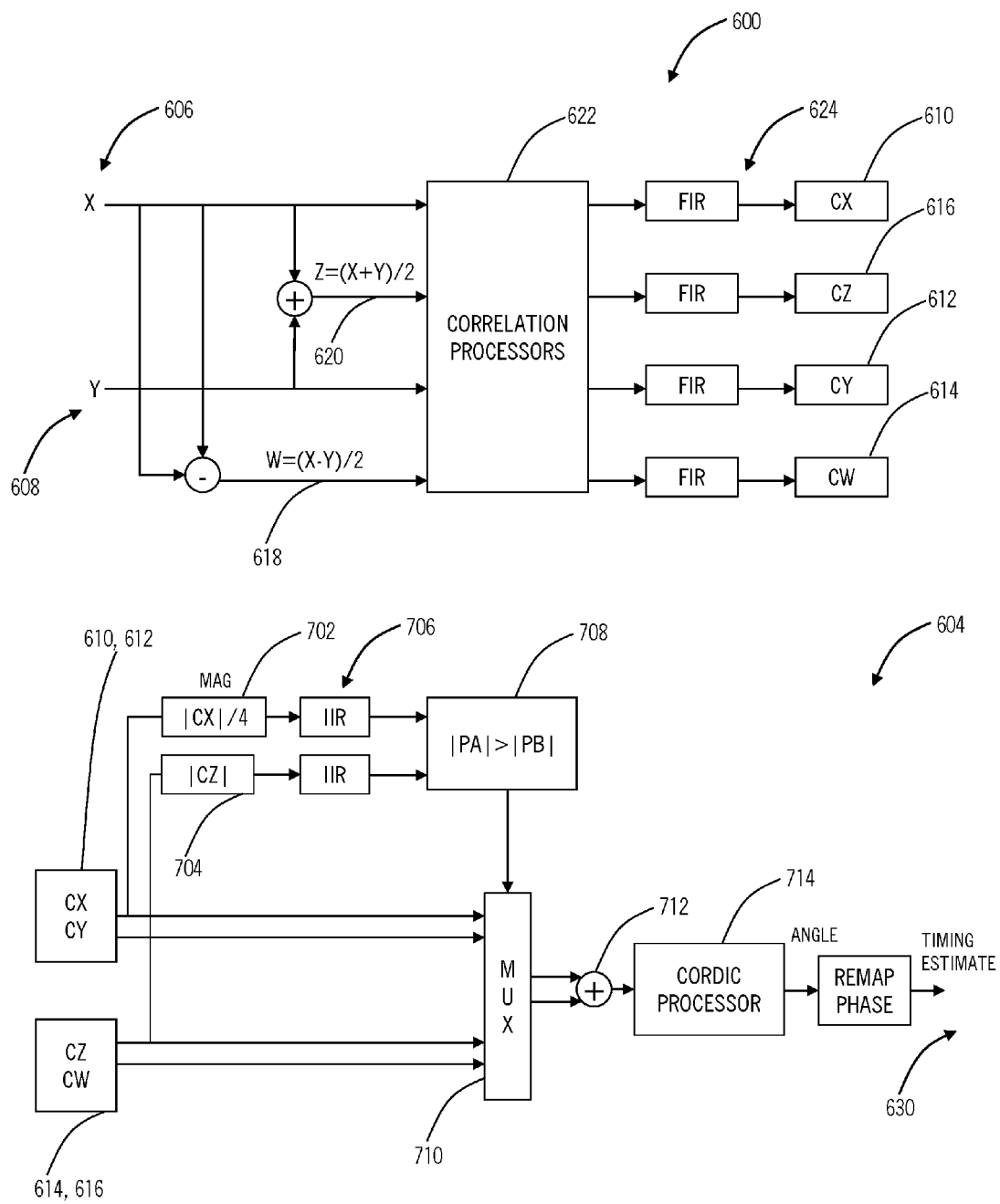
FIG. 7 is a block diagram of the cyclic correlation computation circuit of FIG. 6 and another embodiment of a timing estimate computation circuit.

Referring to FIGS. 6 and 7, in exemplary embodiments, block diagrams illustrate a cyclic correlation computation circuit 600 and timing estimate computation circuits 602, 604. Specifically, the cyclic correlation computation circuit 600 is the same in both FIGS. 6 and 7, and timing estimate computation circuits 602, 604 show different embodiments in FIGS. 5 and 6. The circuits 600, 602, 604 may be integrated in the receiver 100 after the ADCs 104, 106. Specifically, the circuits 600, 602, 604 may be implemented or realized with any of a general purpose processor or collection of processors, a content addressable memory, a digital signal processor (DSP), an application specific integrated circuit (ASIC), a field programmable gate array (FPGA), any suitable programmable logic device (PLD), discrete gate or transistor logic, discrete hardware components, or any combination thereof, designed to perform the functions described herein. The cyclic correlation computation circuit 600 is configured to receive polarization signals X 606 and Y 608 and to compute cyclic correlations CX 610, CY 612, CW 614, CZ 616. The cyclic correlation computation circuit 600 forms W 618 and Z 620 signals through an adder, subtractor, and divisor of the X 606 and Y 608 signals. Each of the signals 606, 608, 618, 620 is input into a correlation processor 622. The correlation processor 622 provides the cyclic correlations CX 610, CY 612, CW 614, CZ 616 following FIR filters 624.

In FIG. 6, the timing estimate computation circuit 602 is configured to compute a timing estimate 630 based on the cyclic correlations CX 610, CY 612, CW 614, CZ 616 from the cyclic correlation computation circuit 600. The circuit 602 adds the cyclic correlations CX 610, CY 612 together and inputs the added signal into a CORDIC processor 632. Similarly, the circuit 602 adds the cyclic correlations CW 614, CZ

616 together and inputs the added signal into a CORDIC processor 634. The CORDIC processors 632, 634 output a magnitude and phase value. The magnitudes are sent to IIR filters 636 and compared by a comparison block 638. The comparison block 638 is configured to operate a multiplexer 640 which in turn outputs an angle value from the CORDIC processors 632, 634 based on the comparison block 638. Note, the timing estimate computation circuit 602 is implementing the computation #2 from above. In FIG. 7, the timing estimate computation circuit 604 is configured to compute a timing estimate 630 based on the cyclic correlations CX 610, CY 612, CW 614, CZ 616 from the cyclic correlation computation circuit 600. The circuit 604 implements the computation #1 from above by taking the magnitude of |CX|/4 702 and |CZ| 704 and filtering these values with IIR filters 706. A comparison block 708 compares the filtered values and operates a multiplexer 710. The multiplexer 710 receives the cyclic correlations CX 610, CY 612, CW 614, CZ 616 as inputs, and provides two outputs based on the comparison block 708. These outputs are added 712 and provided to a CORDIC processor 714 that outputs an angle value for the timing estimate 630.

The two polarization signals X and Y are complex. These signals may be decomposed into real and imaginary parts and compute the real and imaginary parts of the cyclic correlation CX.

$$CX = \sum_{n=0}^{N-2} x_n x_n^* e^{-jn\pi} + \sum_{n=0}^{N-2} \text{Real}(x_n^* x_{n+1}) e^{-j(n-0.5)\pi}$$

$$= \sum_{n=0}^{N-2} (xr_n + jxi_n)(xr_n - jxi_n)(-1)^n +$$

$$j \sum_{n=0}^{N-2} \text{Real}((xr_n - jxi_n)(xr_{n+1} + jxi_{n+1}))(-1)^n$$

$$= \sum_{n=0}^{N-2} (xr_n^2 + xi_n^2)(-1)^n + j \sum_{n=0}^{N-2} (xr_n xr_{n+1} + xi_n xi_{n+1})(-1)^n$$

Next, define the (N−1) element row vectors as follows:

$Xr=[xr_{n-1}(N-1)xr_n(0,1,2,\ldots,N-2)], Xi=[xi_{n-1}(N-1)xi(0,1,2,\ldots,N-2)]$ $Xr^+=xr(0,1,2,\ldots,N-1), Xi^+=xi(0,1,2,\ldots,N-1)$ $M=((-1)^0,(-1)^1,\ldots,(-1)^{N-1})=(1,-1,1,-1\ldots)$ where a sample is used from the previous block to make up one of the correlation terms to allow for the one sample delay, n being a block index. A simplified form may then be expressed as:

$CXr=(Xr \circ M)Xr'+(Xi \circ M)Xi'$ $CXi=(Xr \circ M)(Xr^+)'+(Xi \circ M)(Xi^+)'$ Where ○ indicates an element by element multiplication of the two row vectors and XY' is the matrix multiplication of a row vector with a column vector, i.e.

$XY+=\Sigma x_i y_i$

The other three correlations may be computed the same way as follows:

$CYr=(Yr \circ M)Yr'+(Yi \circ M)Yi'$ $CYi=(Yr \circ M)(Yr^+)'+(Yi \circ M)(Yi^+)'$ $CZr=(Zr \circ M)Zr'+(Zi \circ M)Zi'$ $CZi=(Zr \circ M)(Zr^+)'+(Zi \circ M)(Zi^+)'$ $CWr=(Wr \circ M)Wr'+(Wi \circ M)Wi'$ $CWi=(Wr \circ M)(Wr^+)'+(Wi \circ M)(Wi^+)'$ The product of the two correlation vectors is $CX \cdot CY = CXr \cdot CYr \cdot CXi \cdot CYi + j(CXr \cdot CYi + CXi \cdot CYr)$ $CZ \cdot CW = CZr \cdot CWr \cdot CZi \cdot CWi + j(CZr \cdot CWi + CZi \cdot CWr)$ Assume a hardware block of type A that computes:

$CA=(A \circ M)A'$ and a hardware block of type B that computes:

$CB=(B \circ M)(B^+)'$

Note that the hardware operations of both blocks are the same, namely the sum of the product of its two inputs over a block of N samples. The only difference is that blocks of type B are fed from a delayed version of the input signal. Thus, to compute all the four cyclic correlations at the same time, a total of eight blocks of type A and eight blocks of type B are needed for a total of 16 hardware blocks. However, due to the fact that the reference timing point of the incoming data changes relatively slowly (mainly due to frequency offset and polarization rotation) various levels of sub multiplexing may be used to minimize the hardware as shown next.

For example, using one hardware block of type A and one of type B, the computation may be done as follows:

| | time⇒ | | | |
|---|---|---|---|---|
| input | block1<br>xr | block2<br>xi | block3<br>zr | block4<br>zi |
| A | XMrXr' | XMiXi' | ZMrZr' | ZMiWi' |
| B | XMr(Xr+)' | XMi(Xi+)' | ZMr(Wr+)' | ZMi(Wi+)' |
| | CXr | CXi | CZr | CZi |
| | | | | ax = (CXr · CXr + CXi · CXi)/4 |

| | time⇒ | | | |
|---|---|---|---|---|
| input | block5<br>yr | block6<br>yi | block7<br>wr | block8<br>wi |
| A | YMrYr' | YMiYi' | WMrWr' | WMiWi' |
| B | YMr(Yr+)' | YMi(Yi+)' | WMr(Wr+)' | WMi(Wi+)' |
| | CYr | CYi | CWr | CWi |
| az = CZr · CZr + CZi · CZi | | | | | where the M terms are defined as and the correlation values are filtered prior to storing $$XMr = \sum_{n=0}^{N-1} (-1)^i xr_i$$

$CXr = XMr(Xr)' + XMi(Xi)'$ $CXi = XMr(Xr^+)' + XMi(Xi^+)'$

After computing block 8, the computations for the computation #1 are:

$PAr = CXr \cdot CYr - CXi \cdot CYi$ $PAi = (CXr \cdot CYi + CXi \cdot CYr)$

-continued $$PBr = CZr \cdot CWr - CZi \cdot CWi$$

$$PBi = (CZr \cdot CWi + CZi \cdot CWr)$$

$$mA = PAr \cdot PAr + PAi \cdot PAi$$

$$\tau A = \frac{1}{2\pi}\tan^{-1}\left(\frac{PAi}{PAr}\right)$$

$$mB = PBr \cdot PBr + PBi \cdot PBi$$

$$\tau B = \frac{1}{2\pi}\tan^{-1}\left(\frac{PBi}{PBr}\right)$$

if $(mA) \geq mB)$ $$\tau = \tau A$$

else $$\tau = \tau B$$

$$\tau = \mathrm{mod}(\tau, 1)$$

After computing block 8, the computations for the computation #2 are:

if $ax \geq az$ $Pr = CXr \cdot CYr - CXi \cdot CYi$ $Pi = (CXr \cdot CYi + CXi \cdot CYr)$ else $Pr = CZr \cdot CWr - CZi \cdot CWi$ $Pi = (CZr \cdot CWi + CZi \cdot CWr)$ These two products are used to compute the timing estimate as $$\tau = \mathrm{mod}\left(\frac{1}{2\pi}\tan^{-1}\left(\frac{Pi}{Pr}\right), 1\right)$$

Figure 8:
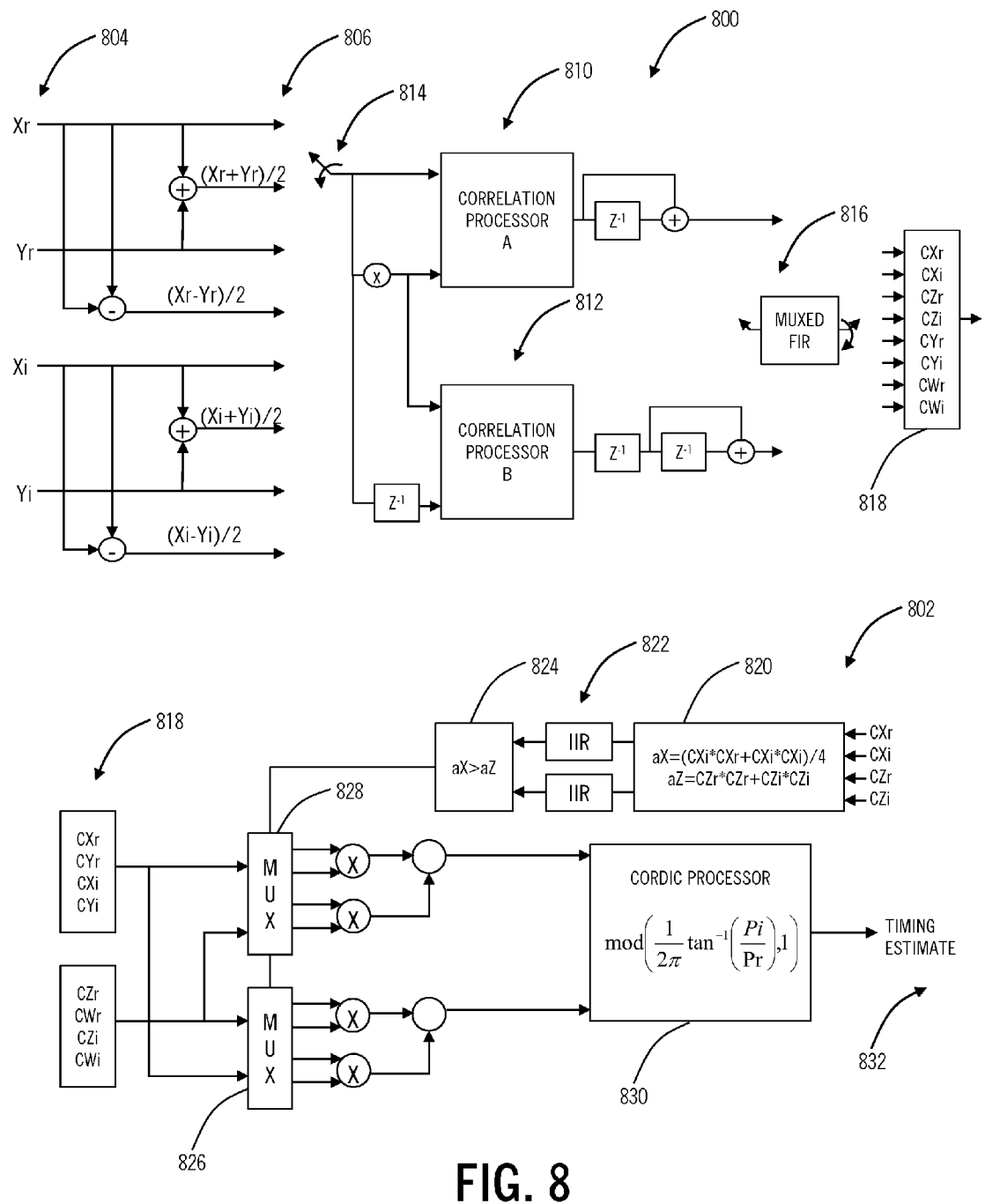
FIG. 8 is a block diagram of a cyclic correlation computation circuit and a timing estimate computation circuit utilizing sub-multiplexing to reduce hardware blocks.

Referring to FIG. 8, in an exemplary embodiment, block diagrams illustrate a cyclic correlation computation circuit 800 and a timing estimate computation circuit 802 for the computation #2 utilizing the one hardware block of type A and one of type B. The circuit 800 receives input signals 804 including $X_r$, $X_i$, $Y_r$, and creates $W_r$, $W_i$, $Z_r$, and $Z_i$ through an adder, subtractor, and divisor. Thus, there are eight possible inputs 806 (including $X_r$, $X_i$, $Y_r$, $Y_i$, $W_r$, $W_i$, $Z_r$, $Z_i$) to hardware block A 810 and to hardware block B 812. These inputs 806 are provided to the hardware blocks 810, 812 via a switch 814. The hardware block A 810 is configured to perform the computation: CA=(A∘M)A' and the hardware block B 812 is configured to perform the computation: CB=(B∘M)(B$^+$)', as described above. Outputs of the hardware blocks 810, 812 connected to a switched multiplexed FIR 816 that fills registers 818 with the cyclic correlations $CX_i$, $CX_r$, $CY_i$, $CY_r$, $CW_i$, $CW_r$, $CZ_i$, and $CZ_r$. The registers 818 are used to input the cyclic correlations $CX_i$, $CX_r$, $CY_i$, $CY_r$, $CW_i$, $CW_r$, $CZ_i$, and $CZ_r$ to the timing estimate computation circuit 802. The circuit 802 includes a computation block 820 that computes $a_x$ and $a_z$ from $CX_i$, $CX_r$, $CZ_i$, and $CZ_r$ and feeds the outputs through IIR filters 822. A comparison block 824 compares the values of $a_x$ and $a_z$ to operate multiplexers 826, 828. The multiplexers 826, 828 connect to multipliers and adders to provide inputs to a CORDIC processor 830. The CORDIC processor 830 computes $$\tau = \mathrm{mod}\left(\frac{1}{2\pi}\tan^{-1}\left(\frac{Pi}{Pr}\right), 1\right)$$

to provide a timing estimate 832 output.

Figure 9:
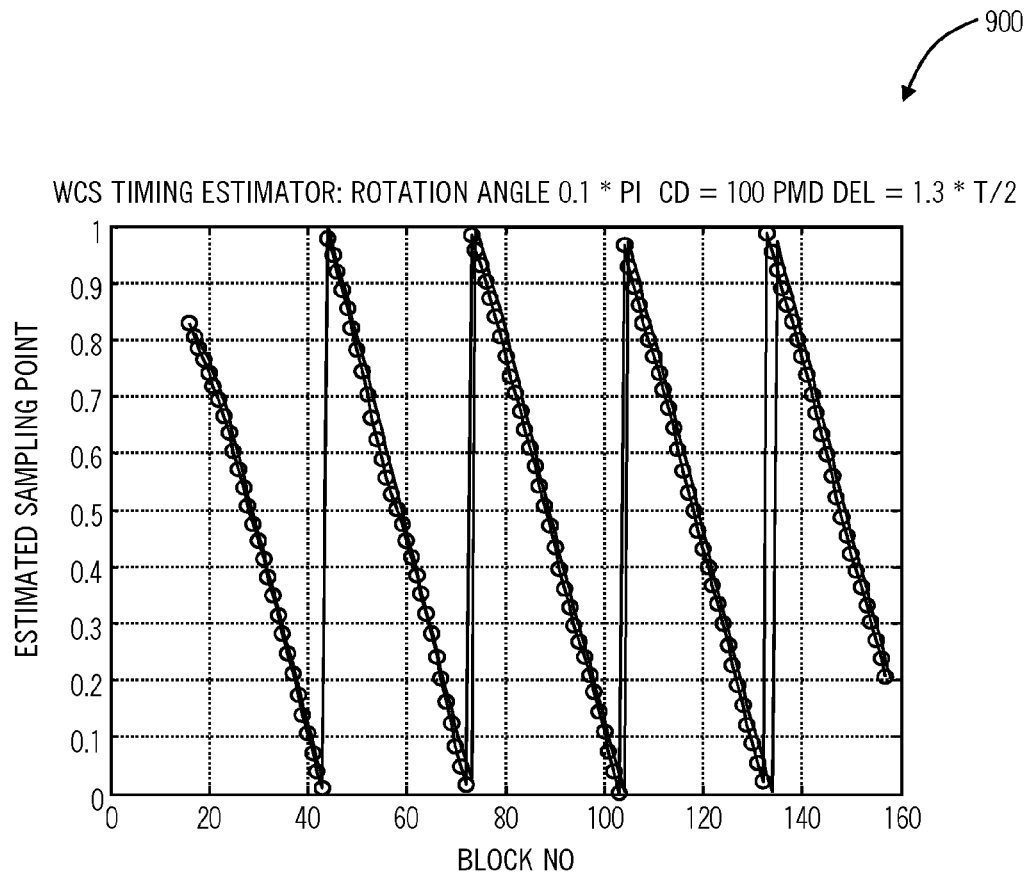
FIG. 9 is a graph of an exemplary implementation of FIG. 8 where the frequency offset is 40 ppm and the PMD rotation is 50 K radians/sec.

Referring to FIG. 9, in an exemplary embodiment, a graph illustrates an exemplary implementation 900 of FIG. 8 where the frequency offset is 40 ppm and the PMD rotation is 50 K radians/sec. The exemplary implementation 900 includes an eight-way sub-multiplexed configuration with N=104 and 16 taps. From the exemplary implementation 900, it may be observed that the estimate follows the linear progress of the timing point with a slight delay as expected.

In various other exemplary embodiments, any number of sub multiplexing options is possible. Thus, anywhere from one to sixteen correlation processors may be used depending on the allowed rate of change of the timing instant with time. Additionally, in very high speed applications, the correlations themselves may be sub multiplexed by computing only one term per block of incoming data and summing this result over a number of blocks with the tradeoff of extra storage required to hold the partial correlation sums.

Single mode fiber exhibits a polarization dependent loss (PDL) that introduces at the receiver a loss of orthogonality between the two transmitted polarizations thereby potentially requiring a modification of the timing estimate. The frequency response of the fiber in the presence of PMD and PDL is given below. A non-zero PDL rotation angle, δ, causes crosstalk between polarizations when the loss term ρ<1.

$$H(\omega, t) = H_{PDL}(t) \cdot H_{PMD/CD}(\omega, t)$$

$$H_{PDL}(t) = \begin{bmatrix} \cos(\omega_o t + \delta) & -\sin(\omega_o t + \delta) \\ \sin(\omega_o t + \delta) & \cos(\omega_o + \delta) \end{bmatrix} \cdot$$

$$\begin{bmatrix} 1 & 0 \\ 0 & \rho \end{bmatrix} \cdot \begin{bmatrix} \cos(\omega_o t + \delta) & \sin(\omega_o t + \delta) \\ -\sin(\omega_o t + \delta) & \cos(\omega_o t + \delta) \end{bmatrix}$$

$$H_{PMD/CD}(\omega, t) = \begin{bmatrix} \cos(\omega_o t + \theta) & -\sin(\omega_o t + \theta) \\ \sin(\omega_o t + \theta) & \cos(\omega_o t + \theta) \end{bmatrix} \cdot$$

$$\begin{bmatrix} e^{j\omega\tau/2} & 0 \\ 0 & e^{-j\omega\tau/2} \end{bmatrix} \cdot \begin{bmatrix} \cos(\omega_o t + \theta) & \sin(\omega_o t + \theta) \\ -\sin(\omega_o t + \theta) & \cos(\omega_o t + \theta) \end{bmatrix} \cdot e^{-j0.5\beta L \omega^2}$$

The loss of orthogonality introduced by this PDL distortion destroys to a small degree the anti-symmetric nature of the cyclic moments exploited by the present invention to produce a timing estimate insensitive to the PMD rotation angle, θ. In particular, when ρ<1 the anti-symmetry between CX and CY is no longer perfect. Similarly, the anti-symmetry between CW and CZ is compromised similarly. As a result, the timing phase estimates produced by combined moments PA and PB are not static with PMD angle θ but exhibit a small variation due to the non-zero PDL angle δ when ρ<1.

Figure 10:
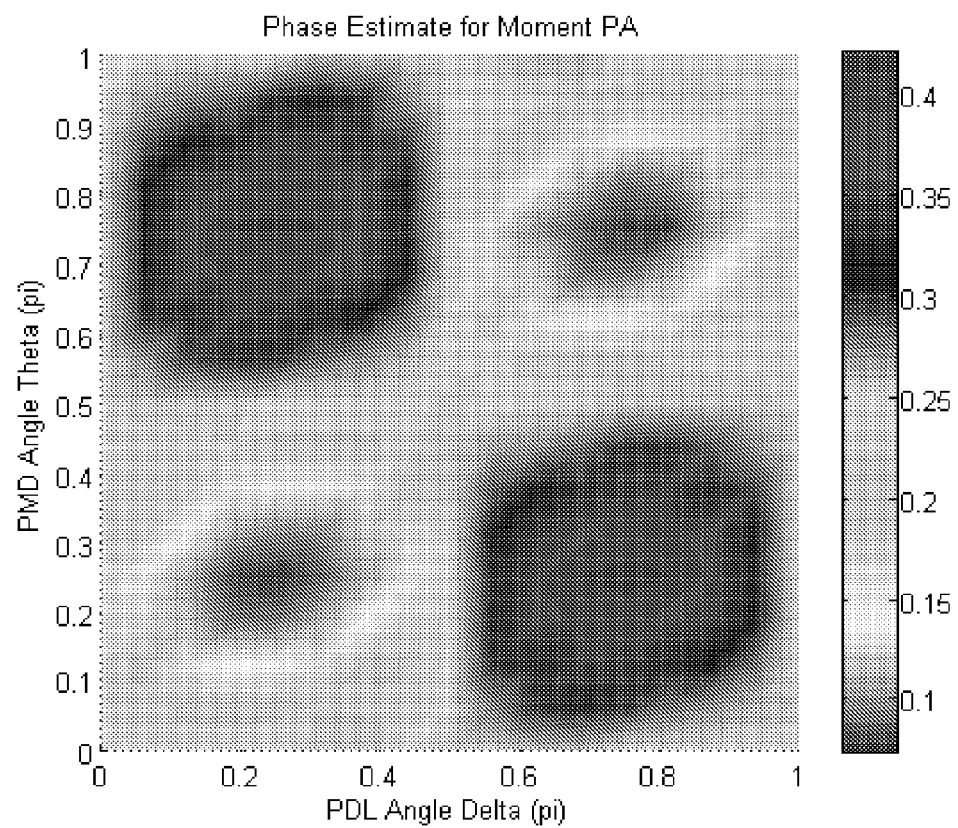
FIG. 10 is a contour plot of the variation in timing estimate, $\tau A$, as a function of PMD angle, $\theta$, and PDL angle, $\delta$, for the case of $20 \log_{10} \rho = -6$ dB and $\tau = 1.25\, T_{baud}$.
Figure 11:
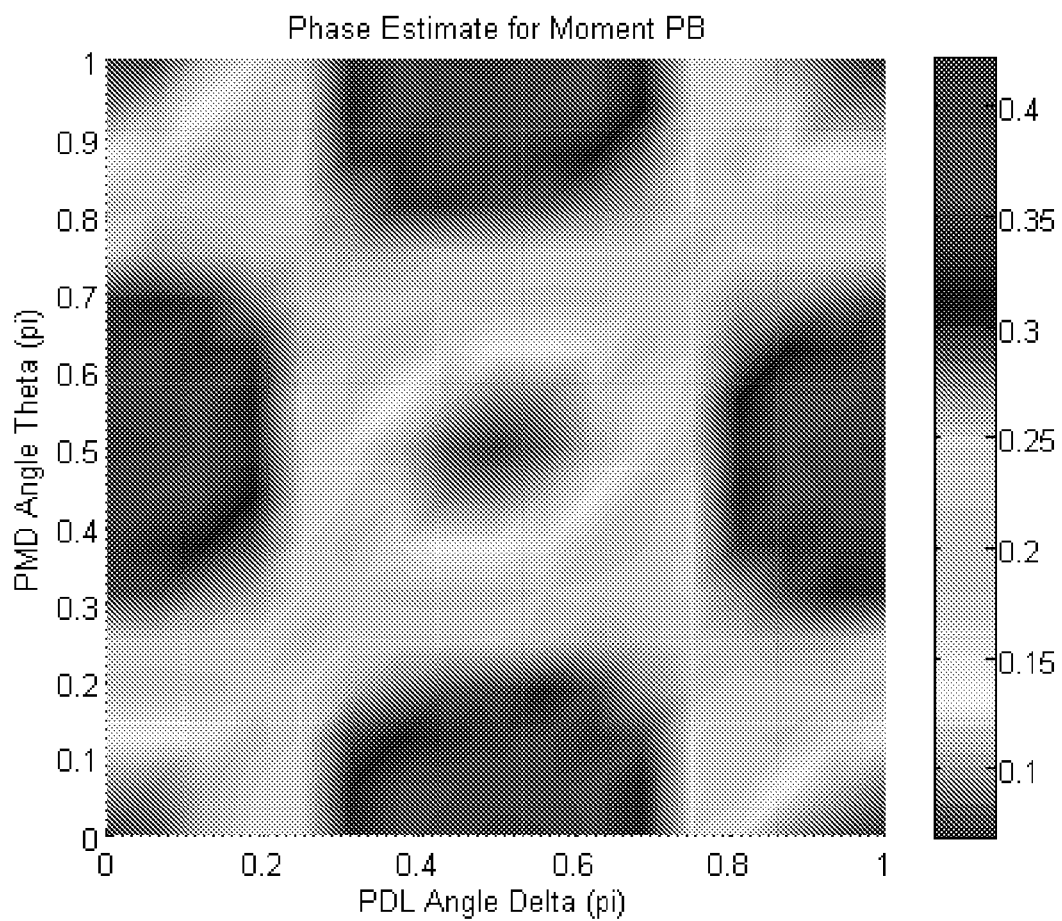
FIG. 11 is a contour plot of the variation in timing estimate, $\tau B$, as a function of PMD angle, $\theta$, and PDL angle, $\delta$, for the case of $20 \log_{10} \rho = -6$ dB and $\tau = 1.25\, T_{baud}$.
Figure 12:
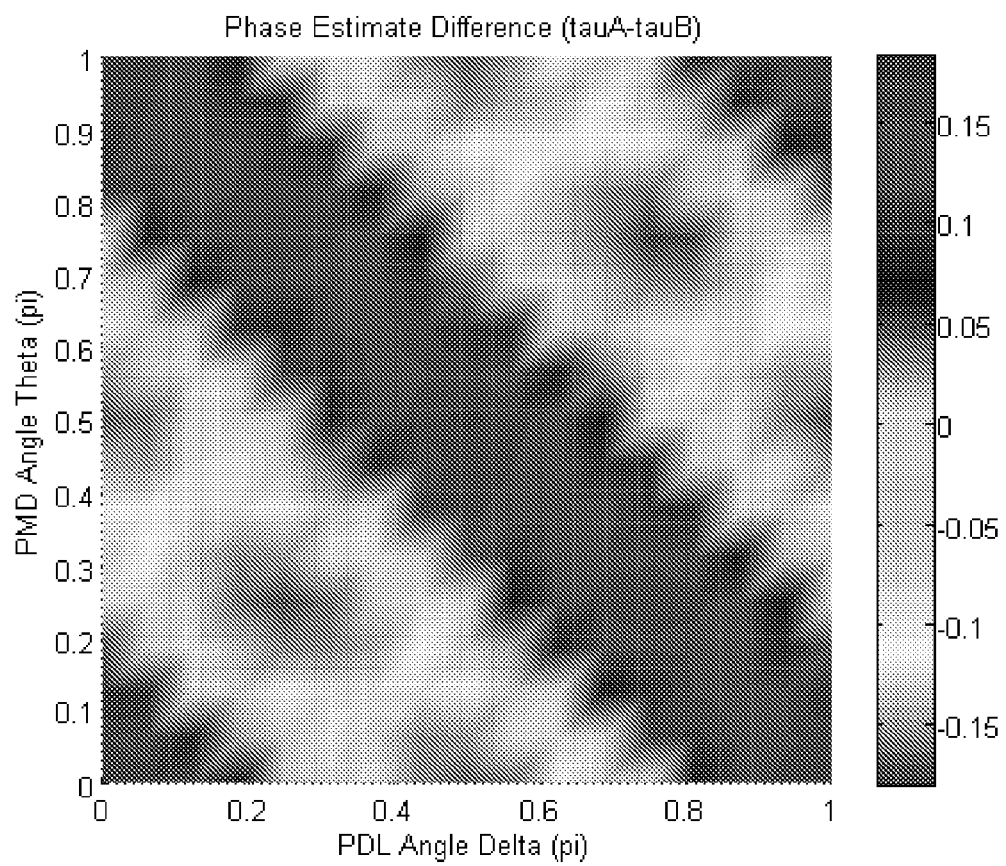
FIG. 12 is a contour plot of the phase discontinuity for the conditions as those of FIGS. 10 and 11.

Referring to FIGS. 10-12, in exemplary embodiments, various graphs illustrate timing estimates as functions of PMD angle, θ, and PDL angle, δ. FIG. 10 shows the variation in timing estimate, τA, as a function of PMD angle, θ, and PDL angle, δ, for the case of 20 log$_{10}$ ρ=−6 dB and τ=1.25 $T_{baud}$. There is a small sinusoidal variation in τA as a function of θ for particular values of δ. The amplitude of the distortion in τA varies inversely as δ (not shown), approaching zero as the PDL approaches 0 dB. FIG. 11 shows the variation in timing estimate, τB, as a function of PMD angle, θ, and PDL angle, δ, for the case of 20 log$_{10}$ ρ=−6 dB and τ=1.25 $T_{baud}$. Again, there is a small sinusoidal variation in τB as a function of θ for particular values of δ. The amplitude of the distortion in τB varies inversely as δ (not shown), approaching zero as the PDL approaches 0 dB. Since the crests and troughs of the phase estimates for τA and τB occur at different rotation angles, there exists places of discontinuity in phase when switching between the two estimates to avoid moment strength dropouts. This phase discontinuity is shown in FIG. 12 for the conditions as those of FIGS. 10 and 11.

Figure 13:
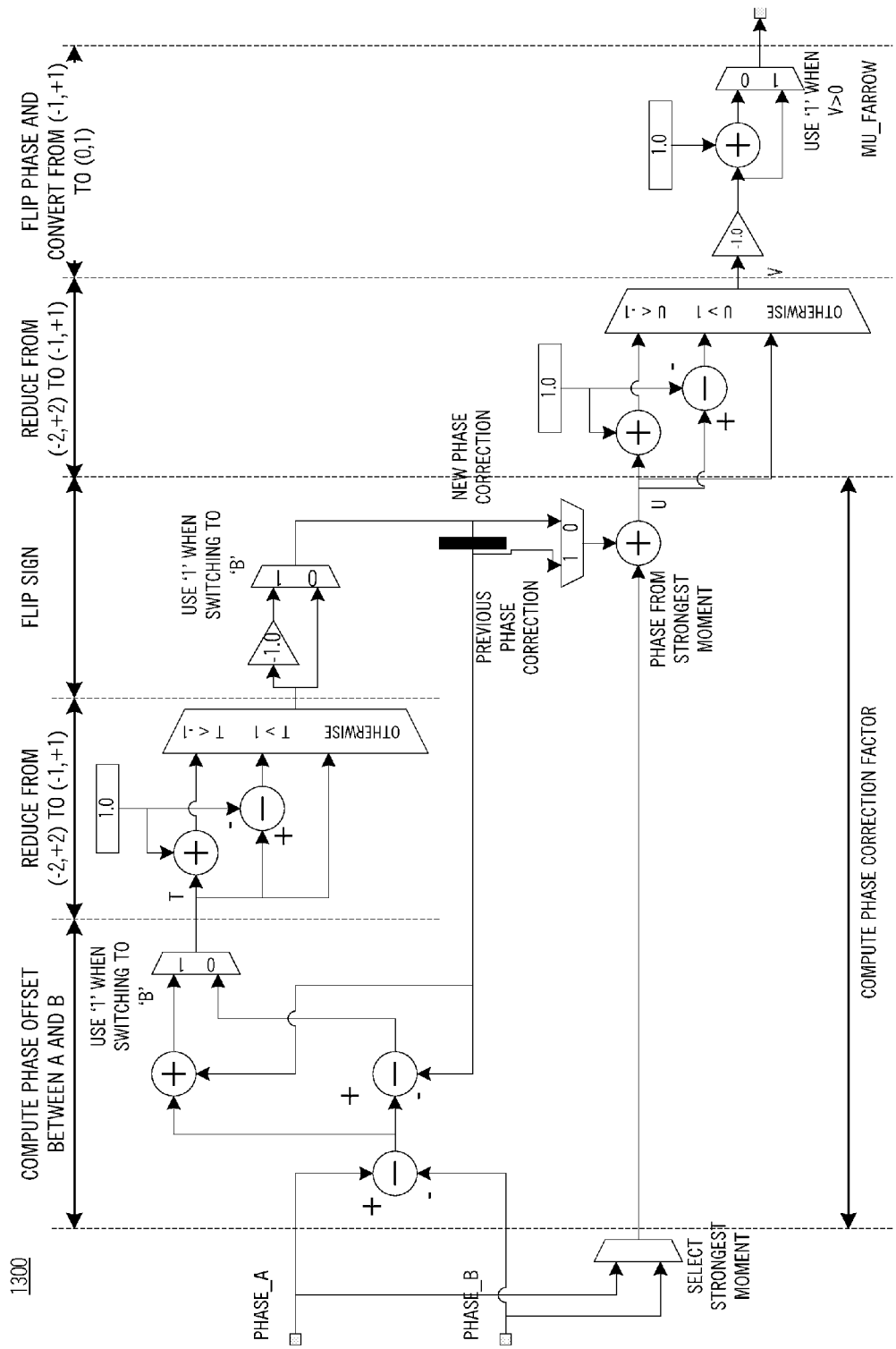
FIG. 13 is a diagram of a phase remapping procedure to adjust for anti-symmetric cyclic moments in both $\theta$ and $\delta$ dimensions.

Referring to FIG. 13, in an exemplary embodiment, a phase remapping procedure 1300 is illustrated to adjust for anti-symmetric cyclic moments in both θ and δ dimensions. Rather than attempt to identify or compute alternate linear combinations of the received signal polarizations that lead to anti-symmetric cyclic moments in both θ and δ dimensions, the present invention applies the "phase remapping" procedure 1300 to ensure the sampling phase remains continuous as the timing estimate is switched from τA to τB and vice-versa. The phase remapping procedure 1300 is applied at moment switch events, and computes a phase correction factor τR that when added to the "destination estimator" (with its now stronger moment) yields a sample phase that is continuous with the phase produced by the "source estimator" (with its previously stronger moment). This process may be described by the following pseudo-code:

```
If (sel == selA)
    tauR_new = (tauA−tauB) + tauR;
else
    tauR_new = (tauB−tauA) − tauR;
end
if (tauR_new > 1)
    tauR_new = tauR_new − 1;
else if (tauR_new < −1)
    tauR_new = tauR_new + 1;
end
if tauR_new > 0
    if (sel == selB)
        tauR = +tauR_new;
    else
        tauR = −tauR_new;
    end
else
    if (sel == selB)
        tauR = +tauR_new;
    else
        tauR = −tauR_new;
    end
end
```

The phase correction factor τR is applied to the current phase estimate τ to obtain the adjusted phase estimate $\tau_{new}$, and to all future phase estimates produced by the "destination estimator" until the next moment switch event. The phase correction using τR may be described by the following pseudo-code:

```
tau_adj = tau + tauR;
if (tau_adj > 1)
    tau_new = tau_adj − 1;
else if (tau_adj < −1)
    tau_new = tau_adj + 1;
else
    tau_new = tau_adj;
end
```

Figure 14:
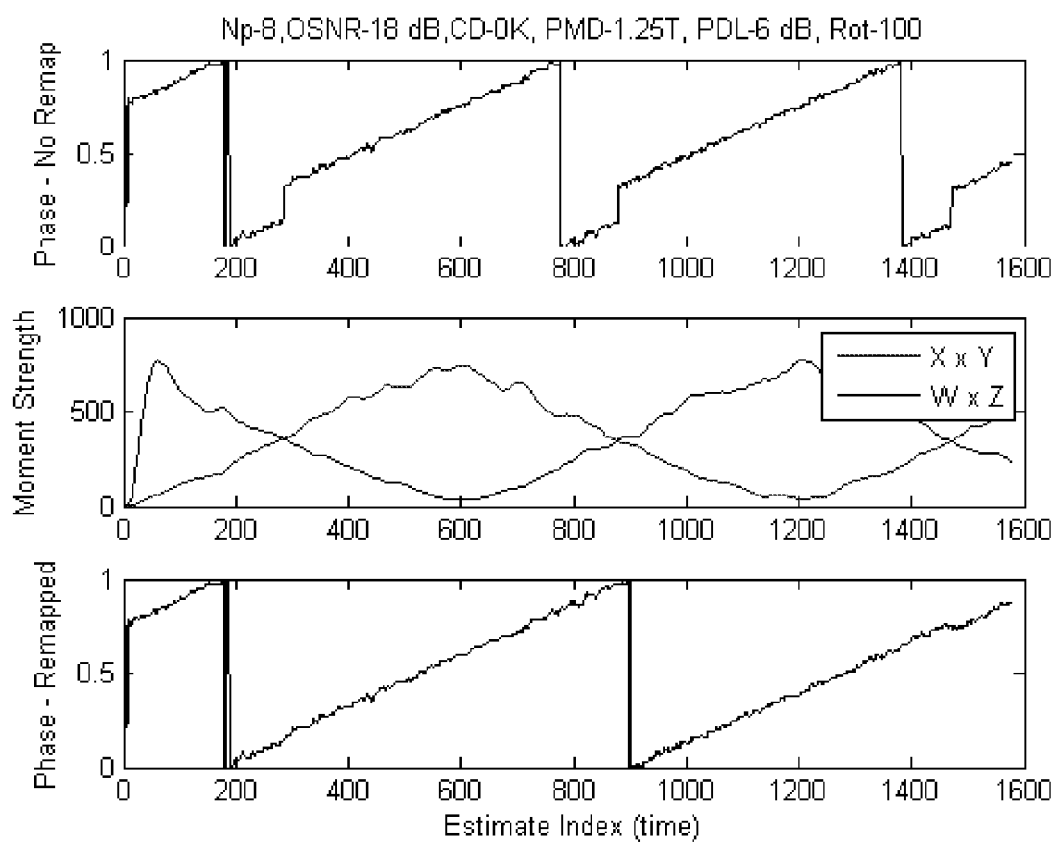
FIG. 14 is a graph of results of an exemplary implementation using the phase remapping procedure of FIG. 13.

Referring to FIG. 14, in an exemplary embodiment, a graph illustrates results of using the phase remapping procedure 1300. The top plot shows the phase estimate produced under conditions of 6 dB of PDL with no phase mapping procedure. Phase discontinuities exist at the points where the timing estimator switches from PA to PB and vice-versa. The middle plot shows the moment strengths of PA and PB, thus identifying the switch points. The bottom plot shows the phase estimate produced under the same PDL conditions when phase remapping is applied. The phase discontinuities are managed explicitly so they do not occur.

Figure 15:
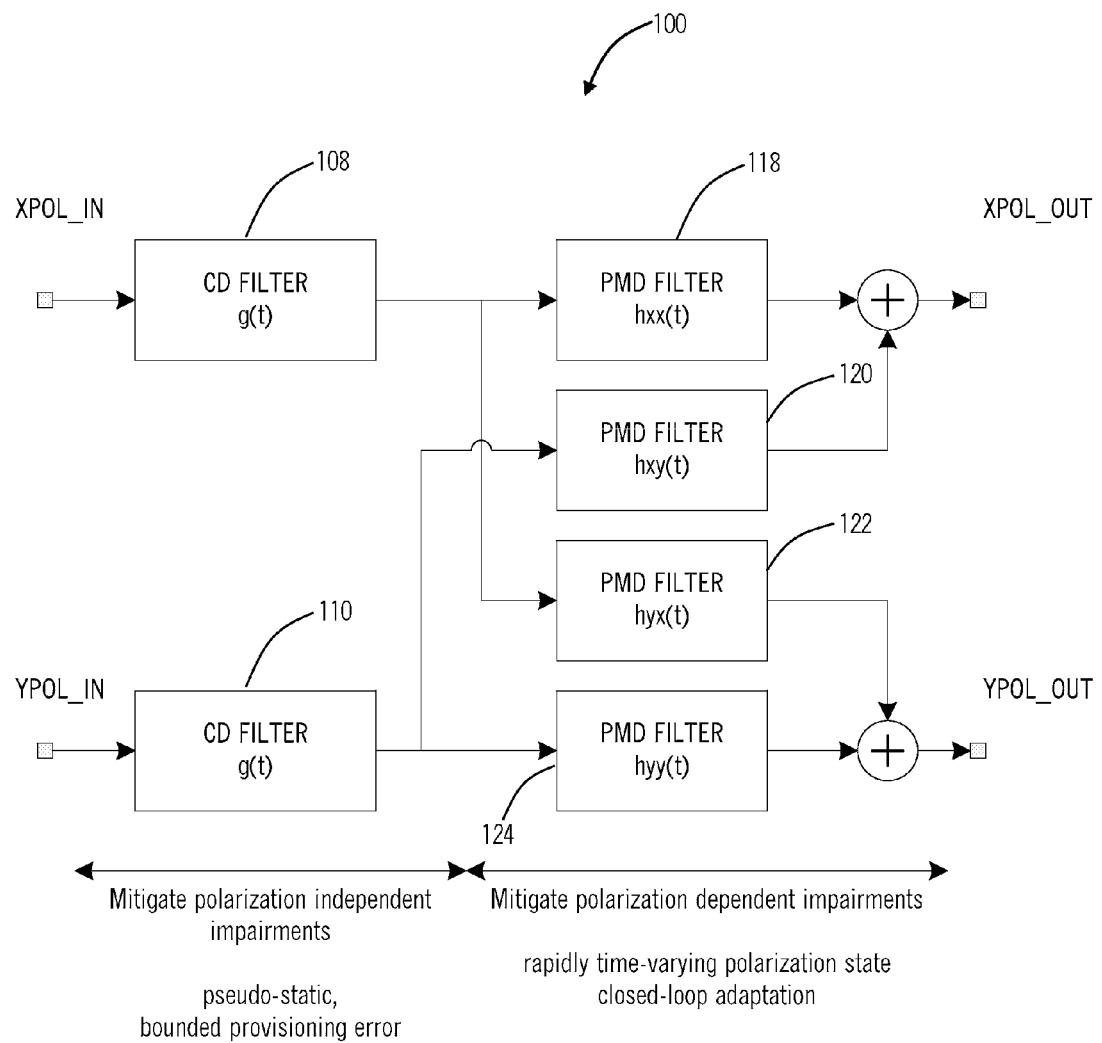
FIG. 15 is a block diagram of the receiver from FIG. 1 highlighting the CD equalizers and PMD equalizers.

Referring to FIG. 15, in an exemplary embodiment, the receiver 100 from FIG. 1 is illustrated highlighting the CD equalizers 108, 110 and PMD equalizers 118, 120, 122, 124. Due to recent advances in GHz digital signal processing capability, systems operating at 40 Gbps and 100 Gbps use coherent transceivers employing electronic dispersion compensation (EDC) technology to mitigate both CD and PMD. Here, in FIG. 15, CD and PMD distortions may be compensated electronically using linear digital filters for the equalizers 108, 110, 118, 120, 122, 124. Without loss of generality, these filters (equalizers) 108, 110, 118, 120, 122, 124 may be partitioned into one set of filters 108, 110 designed to mitigate polarization independent impairments such as CD, and a second set of filters 118, 120, 122, 124 designed to mitigate polarization dependent impairments such PMD and polarization dependent loss (PDL). Typically the latter filters 118, 120, 122, 124 employ a "butterfly" structure to deal with crosstalk between polarizations introduced by PMD and PDL. The filters 108, 110, 118, 120, 122, 124 may be implemented in the time-domain, or the frequency-domain, or as a mixture of both, as dictated by cost and complexity considerations. Indeed, these two sets of filters may be implemented as a single filter structure without the partitioning suggested by FIG. 15. However, typical single carrier systems operating at 100 Gbps partition the EDC filters as shown in FIG. 15 due to the disparate dynamic tracking requirements for compensation of the CD and PMD impairments.

CD in uncompensated long-haul fiber may approach 40,000 ps/nm for typical links. This bulk dispersion is essentially pseudo-static, varying only minimally with temperature, and often known based on network provisioning data to within an error tolerance of ±1500 ps/nm. The required equalization is given in the frequency domain by the following equation, where L is the fiber length, c is the speed of light, D is the dispersion parameter of the fiber, λ is the wavelength and ω is the angular frequency. Note that the single parameter χ≡DL (unknown to the receiver) determines the frequency response of the CD equalizer.

$$G(L, \omega) = \exp\left(-jD \frac{\lambda^2}{2\pi c} \frac{\omega^2}{2} L\right)$$

PMD and PDL change at rates approaching hundreds of kHz due to the rapid time variation in the state of polarization in the fiber. Traditional adaptive filter algorithms such as least mean square (LMS) or constant modulus algorithm (CMA) compute the time-varying filter coefficients for the "butterfly" structure that track these time-varying impairments.

Regardless of the specific architecture partitioning and its time vs. frequency implementation choice, the EDC digital filters 108, 110, 118, 120, 122, 124 require correct sample phase timing to be established by the receiver 100. Timing recovery corrects for the phase and frequency offset between the transmitter and receiver clocks, and is often performed digitally by filtering the spectral line that appears at the symbol rate after squaring the received signal. These algorithms typically require four samples per symbol, although variants requiring only two samples per symbol also exist.

In an exemplary embodiment, the present invention addresses the problem of solving for the unknown dispersion parameter required for equalizing the CD according to its frequency response given above using information produced by unrelated algorithms targeting the timing recovery function. The present invention solves the CD setting, $\chi$, problem using timing phase information contained within the signal. The "CD Tuning Metric" derived from this timing information provides not only a qualitative measure of the current CD setting, $\hat{\chi}$, but also provides the direction in which to adjust, $\hat{\chi}$, to further reduce the error, $(\hat{\chi}-\chi)$, in the current setting. This permits optimization of the CD setting using a "directed" search as compared to the "blind" search practiced conventionally, leading to a significant reduction in the overall search effort. Since the tuning metric is derived from computations already performed by the transceiver for timing recovery, its overall computational cost is minor compared to other conventional methods that may use special-purpose metrics.

Figure 16:
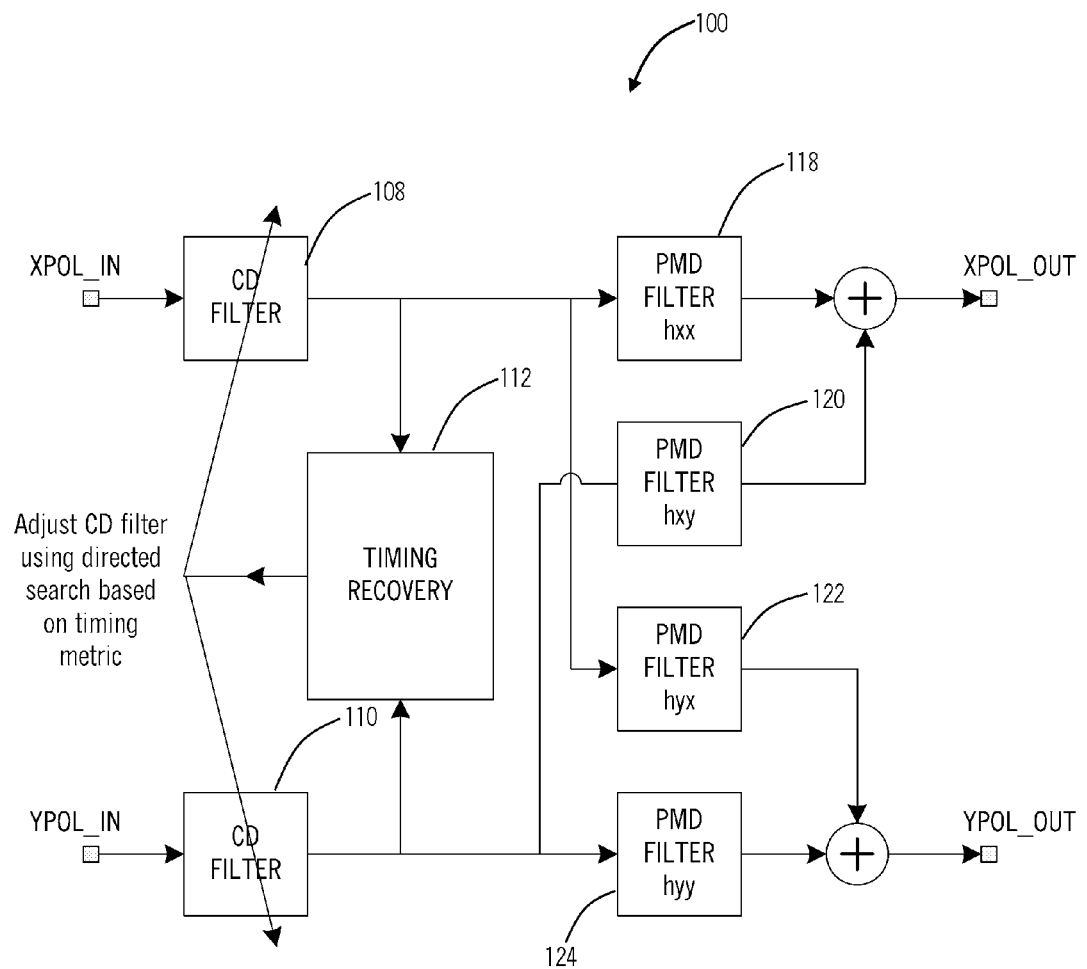
FIG. 16 is a block diagram of the receiver from FIG. 1 highlighting the CD equalizers, the PMD equalizers, and the timing recovery block.

Referring to FIG. 16, in an exemplary embodiment, the receiver 100 from FIG. 1 is illustrated highlighting the CD equalizers 108, 110, the PMD equalizers 118, 120, 122, 124, and the timing recovery block 112. As described herein, separate digital filters 108, 110, 118, 120, 122, 124 provide mitigation for the CD and PMD/PDL distortions, respectively. The CD and PMD/PDL filters 108, 110, 118, 120, 122, 124 may use time-domain and/or frequency-domain implementation as deemed appropriate; this choice has no bearing on the present invention. Timing recovery is performed at the output of the CD equalizers 108, 110 through the timing recovery block 112, and may use one or both polarizations as desired for dual-polarization systems. In the timing recovery block 112, the present invention assumes timing recovery is performed using a digital algorithm that recovers sample phase from the spectral line present at the baud rate of the squared received signal. This may include the various methods described herein. Alternatively, the present invention also contemplates any other algorithm such as M. Oerder and H. Meyr, "Digital Filter and Square Timing Recovery", IEEE Transactions on Communications, Vol. 36, No. 3, March 1988; Y. Wang et. al., "An Alternative Blind Feedforward Symbol Timing Estimator Using Two Samples Per Baud", IEEE Transactions on Communications, Vol. 51, No. 9, September 2003; Y. Yang et. al., "Performance Analysis of a Class of Nondata-Aided Frequency Offset and Symbol Timing Estimators for Flat-Fading Channels", IEEE Transactions on Signal Processing, Vol. 50, No. 9, September 2002; and the like.

The present invention exploits the observation that the strength of the cyclic moments computed the timing recovery algorithms vary with the level of uncompensated CD. This allows one to use these timing moment magnitudes as a metric for directing the search for the best CD setting, $\hat{\chi}$.

For example, the timing estimate produced by algorithm Y. Wang et. al., "An Alternative Blind Feedforward Symbol Timing Estimator Using Two Samples Per Baud", is as follows:

$$\hat{\varepsilon} = \frac{1}{2\pi}\arg\left\{\sum_{n=0}^{N-1}|x(n)|^2 e^{-jn\pi} + \sum_{n=0}^{N-1}\text{Re}\{x^*(n)x(n-1)\}e^{-j(n-0.5)\pi}\right\}$$

$$\equiv \frac{1}{2\pi}\arg\{\Phi\}.$$

Figure 17:
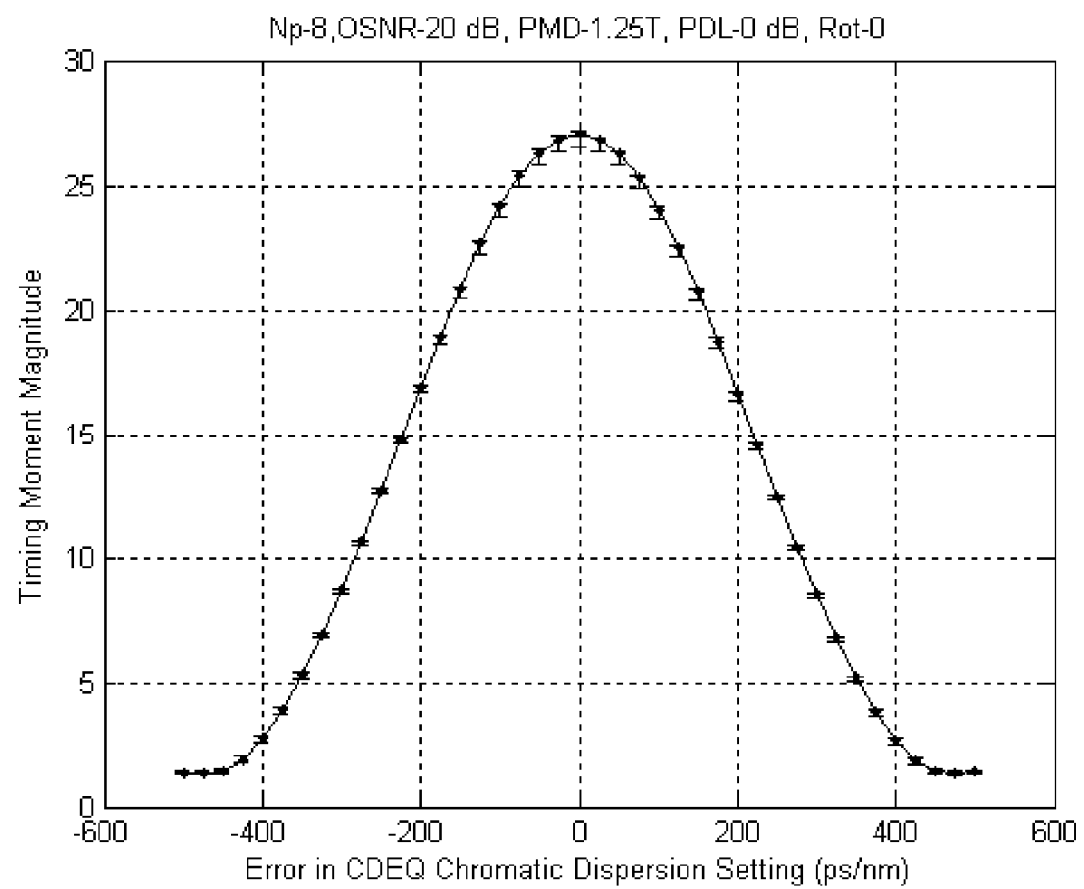
FIG. 17 is a graph of an exemplary implementation plotting timing moment magnitude versus error in the CD equalizer.

Referring to FIG. 17, in an exemplary embodiment, a graph illustrates an exemplary implementation plotting timing moment magnitude versus error in the CD equalizer. The variation in the strength, $|\Phi|$, of the timing moment is plotted against the error $(\hat{\chi}-\chi)$ in CD setting for a fiber model with mean PMD set to 1.25 Tbaud. As is clearly observed, the moment strength is maximized when the error is zero, and the strength decreases monotonically as the error in CD setting increases. This allows one to perform a "directed search" to optimize the CD setting as opposed to the "blind search" in the prior art.

It is interesting to note that this invention employs a timing-related mechanism for steering the CD settings, namely the strength of 2nd-order timing moments. Earlier works attempt to extract timing-related information using only a small portion of the received signal bandwidth centered around the clock frequency, whereas the present invention exploits fundamental moment information computed from the full bandwidth of the received signal. In addition, the prior art uses RF processing that is bulky and costly as compared to the present invention that permits high levels of integration into transceiver chipsets resulting the use of baseband digital signal processing.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A receiver, comprising:
an optical module receiving a quadrature amplitude modulated optical signal;
analog-to-digital conversion circuitry configured to convert the quadrature amplitude modulated optical signal into a digital signal; and
timing recovery circuitry configured to provide a timing estimation of the digital signal utilizing a cyclic correlation;
wherein the quadrature amplitude modulated optical signal comprises a polarization multiplexed signal with two polarizations X and Y, and wherein the cyclic correlation for each polarization is a function of an angle between X and Y and delay between X and Y;
wherein the timing recovery circuitry is configured to form two new signals W and Z from X and Y to overcome nulls in the cyclic correlation, and wherein the timing estimation is provided utilizing cyclic correlations associated with each of the signals X, Y, W, and Z; and
wherein the timing recovery circuitry is configured to compute a timing estimate A based upon the cyclic correlations associated with the signals X and Y and a timing estimate B based upon the cyclic correlations associated with the signals W and Z, and wherein the timing recovery circuitry is configured to select either the timing estimate A or the timing estimate B based upon a comparison involving two or more of the cyclic correlations associated with each of the signals X, Y, W, and Z.

2. The receiver of claim 1, further comprising:
chromatic dispersion equalization configured to filter chromatic dispersion on either the quadrature amplitude modulated optical signal or the digital signal, wherein settings on the chromatic dispersion equalization are based upon timing moment magnitudes from the timing recovery circuitry.

3. The receiver of claim 1, wherein the timing recovery circuitry is configured to provide the timing estimation in the presence of polarization mode dispersion, polarization dependent loss, and polarization delay imbalance.

4. The receiver of claim 1, wherein the timing recovery circuitry utilizes sub multiplexing to minimize hardware in the timing recovery circuitry.

5. The receiver of claim 1, wherein the timing recovery circuitry is further configured to perform a phase remapping procedure when switching between the timing estimate A and the timing estimate B.

6. An optical receiver with chromatic dispersion equalization, comprising:

an optical module receiving a quadrature amplitude modulated optical signal;

analog-to-digital conversion circuitry configured to convert the quadrature amplitude modulated optical signal into a digital signal;

timing recovery circuitry configured to provide a timing estimation of the digital signal utilizing a cyclic correlation; and chromatic dispersion equalization configured to filter chromatic dispersion on either the quadrature amplitude modulated optical signal or the digital signal, wherein settings on the chromatic dispersion equalization are based upon timing moment magnitudes from the timing recovery circuitry;

wherein the quadrature amplitude modulated optical signal comprises a polarization multiplexed signal with two polarizations X and Y, and wherein the cyclic correlation for each polarization is a function of an angle between X and Y and delay between X and Y;

wherein the timing recovery circuitry is configured to form two new signals W and Z from X and Y to overcome nulls in the cyclic correlation, and wherein the timing estimation is provided utilizing cyclic correlations associated with each of the signals X, Y, W, and Z; and wherein the timing recovery circuitry is configured to compute a timing estimate A based upon the cyclic correlations associated with the signals X and Y and a timing estimate B based upon the cyclic correlations associated with the signals W and Z, and wherein the timing recovery circuitry is configured to select either the timing estimate A or the timing estimate B based upon a comparison involving two or more of the cyclic correlations associated with each of the signals X, Y, W, and Z.

7. The optical receiver of claim 6, wherein the settings comprise a frequency response of the chromatic dispersion equalization.

8. The optical receiver of claim 6, further comprising searching circuitry configured to perform a directed search for the settings based upon the timing moment magnitudes.

9. The optical receiver of claim 6, wherein the timing recovery circuitry is configured to provide the timing estimation in the presence of polarization mode dispersion, polarization dependent loss, and polarization delay imbalance.

10. The optical receiver of claim 6, wherein the timing recovery circuitry utilizes sub multiplexing to minimize hardware in the timing recovery circuitry.

11. The optical receiver of claim 6, wherein the timing recovery circuitry is further configured to perform a phase remapping procedure when switching between the timing estimate A and the timing estimate B.

* * * * *